US012633283B1

(12) United States Patent
Dhamala et al.

(10) Patent No.: US 12,633,283 B1
(45) Date of Patent: May 19, 2026

(54) NATURAL LANGUAGE INPUT PROCESSING ERROR DETECTION

(71) Applicant: Amazon Technologies, Inc., Seattle, WA (US)

(72) Inventors: Jwala Dhamala, Sunnyvale, CA (US); Rahul Gupta, Waltham, MA (US); Anil K Ramakrishna, Culver City, CA (US); Qian Hu, Bellevue, WA (US); Rohit Parimi, Syosset, NY (US); Li Zhang, Westfield, NJ (US); Anurag Dwarakanath, Bangalore (IN); Tamal Krishna Kuila, Chinsurah (IN); Sai Pritam Varma Penumatsa, Bangalore (IN); Dongyi He, Medford, MA (US); Payal Motwani, Revere, MA (US); Morteza Ziyadi, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 316 days.

(21) Appl. No.: 18/330,221

(22) Filed: Jun. 6, 2023

(51) Int. Cl.
*G10L 15/01* (2013.01)
*G10L 15/06* (2013.01)

(52) U.S. Cl.
CPC ............ *G10L 15/01* (2013.01); *G10L 15/063* (2013.01)

(58) Field of Classification Search
None
See application file for complete search history.

(56) References Cited

U.S. PATENT DOCUMENTS

| | | | |
|---|---|---|---|
| 10,943,583 B1 * | 3/2021 | Gandhe | G10L 15/183 |
| 11,355,122 B1 * | 6/2022 | Gonzalez | G10L 21/10 |
| 2020/0168226 A1 * | 5/2020 | Ganti | G06F 3/167 |

* cited by examiner

*Primary Examiner* — Nicole A K Schmieder
(74) *Attorney, Agent, or Firm* — Pierce Atwood LLP

(57) ABSTRACT

Techniques for determining that processing with respect to a user input will result in an error and ranking clusters of features associated with the user input based on a likelihood that the feature caused the error are described. The system receives user input data, extracts features corresponding to the user input data, and clusters the features based on a similarity to features of other user inputs. The resulting clusters and the user input data are processed to determine whether processing of the user input data will result in an error and a list of the clusters ranked based on a likelihood that the corresponding feature caused the error. Based on the ranked list of the clusters, an error type is attributed to the error and steps for re-configuring a component causing the error are determined.

20 Claims, 9 Drawing Sheets

FIG. 7

NATURAL LANGUAGE INPUT PROCESSING ERROR DETECTION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 is a block diagram conceptually illustrating example components of a device, according to embodiments of the present disclosure.

DETAILED DESCRIPTION

Figure 1:
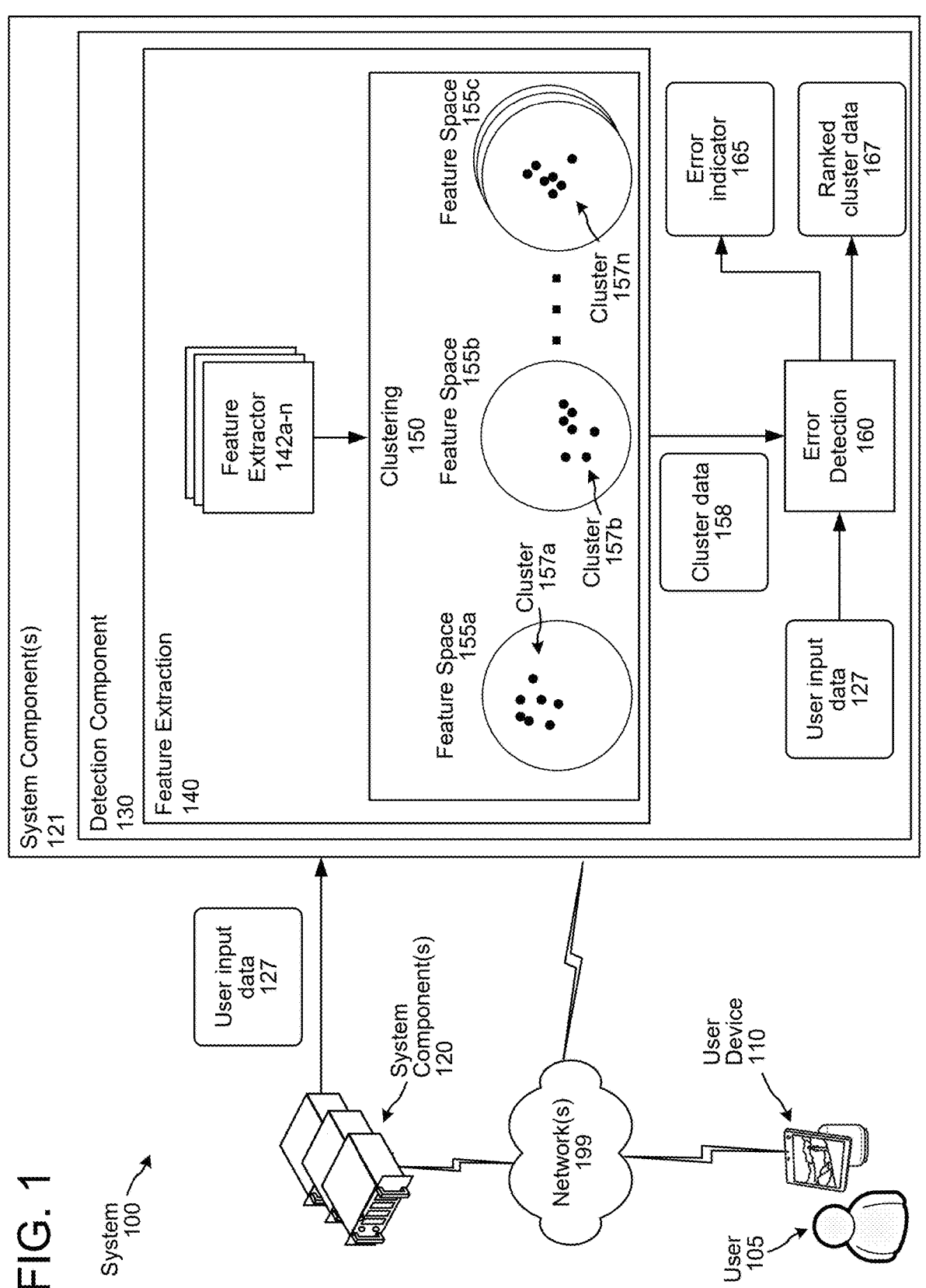
FIG. 1 is a conceptual diagram illustrating a detection component used for determining whether processing with respect to a user input will result in an error, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door"," the system may cause a "front door" smart lock to set to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform NLU processing on the ASR data to determine an intent of the user input as well as portions of the user input that may be used to perform an action responsive to the user input.

For various reasons the system may not produce the user's desired output/response. For example, the system may respond "I am sorry, I cannot help you with that." In other cases, the system may not respond at all. In yet other cases, the system may generate an output that does not correspond to the user input. For example, a user may request the system to play a song or a movie, and the system may respond by playing a song or movie different from what was requested by the user. Such undesired responses may be the result of erroneous processing by one or more components of the system.

The present disclosure provides techniques for determining whether processing with respect to a user input will result in an error. In some cases, erroneous processing by one or more system components may result in an error that may be identified using features that are similar among a group of user inputs. For example, a group of user inputs may have similar words; another group of user inputs may have similar entities; yet another group of user inputs may have similar intents; etc. The system of the present disclosure may be further configured to rank the group of user inputs based on a likelihood that the corresponding feature will cause the error, which may enable the system to further identify the error.

The present disclosure further provides techniques for determining a component of the system that is causing an error with respect to a group of user inputs. The present disclosure further provides techniques for routing one or more user inputs corresponding to the error-prone group to a mitigation technique for remedying the error with respect to the error-causing component (e.g., generating and/or modifying a training set for training of the component). Examples of a mitigation technique include generating a training set including one or more user inputs corresponding to the error prone group, where the NLU processing resulted in a low confidence interpretation score, for training of the NLU component, generating a training set including the one or more user inputs corresponding to the error prone group for training of the component, where the training set is to be used as negative examples (e.g., labeled as an example of a user input that was incorrectly processed on), processing one or more user inputs corresponding to the error-prone group determined to include unique features (uncommon carrier phrases, uncommon words, etc.) to generate lexically similar user inputs for generating a training set for training of a component associated with the error, and routing of one or more user inputs corresponding to an ASR processing error prone group to a component configured to generate a rewritten representation of the ASR data for the user input.

Teachings of the present disclosure provide, among other things, a reduction in undesired responses to user inputs, which in turn provides an improved user experience. By identifying whether processing with respect to a particular user input may result in an error, the system may take remedial actions. As a result of the present disclosure's teachings, a frequency at which processing of the system results in an error is decreased, which in turn decreases the frequency in which the system's generation of responsive output data is incorrect. This may result in an improvement in interactions between the users and the system.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 including a detection component 130 for determining whether processing of a user input will result in an error and identifying one or more features associated with the user input that could have caused the error. As shown in FIG. 1, the system 100 may include a user device 110, local to a user 105, in communication with a system component(s) 120 via a network(s) 199. As further shown in FIG. 1, the system component(s) 120 may be in communication with a system component(s) 121 via the network(s) 199. The network(s) 199 may include the Internet and/or any other wide- or local-area network, and may include wired, wireless, and/or cellular network hardware.

The system component(s) 121 may include, among other things, components for error detection and error attribution based on user input features, as described herein. With reference to FIG. 1, the system component(s) 121 may include the detection component 130, which may further include a feature extraction component 140 and an error detection component 160. The feature extraction component 140 may further include one or more feature extraction components 142a-n and a clustering component 150. In some embodiments, one or more of the system component(s) 121 may be implemented as part of the system component(s) 120.

As shown in FIG. 1, the system component(s) 121 receives user input data 127 from the system component(s) 120. In some instances, the user input data 127 may correspond to a user input. For example, prior to the system component(s) 121 receiving the user input data 127, the system component(s) 120 may receive audio data representing a user input. The audio data may include a user input spoken by the user 105 and captured by the user device 110. In some instances, the audio data may be included in the user input data 127.

In some instances, the user input data 127 may include a textual or tokenized representation of the user input. For example, the system component(s) 120 may perform natural language processing using the audio data captured by the user device 110 to determine natural language processing (NLP) data. In particular, the system component(s) 120 may perform automatic speech recognition (ASR) processing on the audio data to determine ASR data corresponding to the user input. As described below, with respect to FIG. 5, the system component(s) 120 may determine ASR data that includes an ASR N-best list including multiple ASR hypotheses and corresponding confidence scores representing what the user may have said. The ASR hypotheses may include text data, token data, etc. determined by an ASR component (e.g., ASR component 550) as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the user input data 127 may include a top scoring ASR hypothesis of the ASR data.

In some instances, the user input data 127 may also or instead include NLU data. For example, in some instances, the system component(s) 120 may perform natural language understanding (NLU) processing using one or more ASR hypotheses to determine NLU data. In some embodiments, the system component(s) 120 may select the top ASR hypothesis to perform NLU processing. In other embodiments, the system component(s) 120 may select more than one ASR hypothesis for NLU processing. As described below, with respect to FIG. 5, the system component(s) 120 may determine NLU data that includes an NLU N-best list including multiple NLU hypotheses and corresponding confidence scores. The NLU N-best list may be determined by a NLU component (e.g., NLU component 560) that may include various other components, such as, intent classification, entity tagger, entity recognizer, etc. As described below, with respect to FIG. 5, the NLU data may include an intent corresponding to the user input, one or more entity types identifying parts of the user input (such as, noun, city name, place, artist name, song name, etc.), and entity names represented in the user input (such as, the name of the artist, the name of the song, the name of the city, etc.).

The system component(s) 121 receives the user input data 127 and sends the user input data 127 to the detection component 130. The detection component 130 may be configured to process the user input data 127 to determine one or more feature vectors including one or more features associated with the user input data 127 (e.g., one or more features associated with the audio data, ASR data, NLU data, and/or context data associated with the user input). The one or more features of the feature vector(s) are clustered based on their similarity to features associated with previously received user inputs. A text or tokenized representation of the user input is processed, along with one or more clusters to which the one or more features of the user input are assigned, to determine whether processing of the user input may result in an error. The detection component 130 may also determine an ordering of the one or more clusters based on a likelihood that the one or more features of the user input represented by the clusters caused the error.

The feature extraction component 140 of the detection component 130 may process the user input data 127 using one or more components (e.g., the one or more feature extractor components 142*a-n*) to determine the feature vector(s) representing the one or more features associated with the user input data 127 (e.g., associated with the audio data, ASR data, NLU data, and/or context data associated with the user input).

The feature extractor component(s) 142*a-n* may implement various machine learning models and/or processing techniques and may process the user input data 127 to determine feature vector(s) representing various features associated with the user input. The features may be extracted from the user input data 127 (e.g., the ASR data, the NLU data, context data, audio data, etc. included in the user input data 127).

For example, the one or more feature extractor(s) 142*a-n* may process the user input data 127 to generate a feature vector(s) representing an ASR token count corresponding to the user input, a sentiment corresponding to the user input (e.g., sad, happy, frustrated, etc.), language styles (e.g., politeness, formality, etc.,), syntax, vernacular, vocabulary, a lexical diversity of the tokens included in the user input, etc. In some embodiments, a lexical diversity of the tokens included in user input may represent the variety of words (or absence of lexical repetition) included in the user input. For example, a user input that is lexically diverse may be "the professor performed diligent research for his latest white-paper to ensure the hypothesis was properly supported," whereas a user input that is not lexically diverse may be "The professor researched his theory before writing his paper." The feature vector(s) may also represent, for further example, an utterance score, a dialog outcome, ASR boost-ing features (e.g., ASR confidence score(s), ASR entity token score(s), etc.), intent boosting features (e.g., NLU confidence score(s), intent score(s), domain(s), etc.) entity recognition boosting features (e.g., NLU entity score(s), etc.) and other features (e.g., a user-perceived error type). The feature vector(s) may also include features representing context data, where the context data may include dialog session data, user profile data, geographic data, historical information from previous user interactions, device type information, on-screen entities (such as content titles, actors, locations, etc. being shown on a screen of the user device 110 and displayed to the user 105), information from active skill(s), and other contextual data. The feature vector(s) may further include features related to the audio data (e.g., pitch, frequency, energy band representation, volume, etc.).

In some embodiments, the feature extractor component(s) 142*a-n* may implement an ML model to generate the one or more features, such as a Transformer (e.g., Bidirectional Encoders Representation from Transformers (BERT), Gen-erative Pre-trained Transformer (GPT), etc.), a neural net-work (e.g., a long short term memory (LSTM) model, a recurrent neural network (RNN), a deep neural network (DNN), etc.), an audio feature model (e.g., a Kaldi feature extractor, a Praat-based acoustic feature extractor, etc.), etc.

For further example, the feature extraction component(s) 142*a-n* may include a feature extraction component 142*a* configured to process the user input data 127 (e.g., the ASR data) to generate a user input embedding representing the user input. The feature extraction component 142*a* may take as input a text or tokenized representation of the user input (e.g., the transcript of the user input included in the ASR data included in the user input data 127) and may encode the text or tokenized representation of the user input to generate the user input embedding.

In some embodiments, the user input embedding may correspond to one or more points in a multi-dimensional embedding space of user inputs, wherein each point is associated with one or more different semantic meanings corresponding to a user input. The embedding space may be an N-dimensional space, wherein each dimension of the embedding space corresponds to a dimension (e.g., degree of freedom) of the vector representing a semantic meaning of a user input. Points in the embedding space near each other may correspond to user inputs that are semantically similar, while points far from each other may correspond to user inputs which are not semantically similar. Regions of the embedding space may thus correspond to one or more different semantic meanings; a first region in the embedding space may, for example, represent user inputs which corre-spond to a user input including a particular type of vocabu-lary (e.g., includes slang), while a second region in the embedding space may representing user inputs which cor-respond to a particular topic (e.g., music).

The user input embedding space may be defined by processing text or tokenized data representing user inputs corresponding to different semantic meanings with an encoder, (e.g., the feature extraction component 142*a*) such as a trained neural network encoder (e.g., a Transformer such as BERT, GPT, etc.). First text data may, for example, include a user input corresponding to a request to play a song by an artist. The encoder may process this text data and determine output embedding data that represents the seman-tic meaning of the text data. The point and/or region in the embedding space corresponding to the embedded data may then be associated with a request to play music by the indicated artist.

In some embodiments, the feature extraction comp-onent(s) 142*a-n* may include another feature extraction component configured to process the user input data 127 (e.g., the ASR data) to generate a user input embedding representing the user input, except where the user input embedding space may correspond to one or more points in a multi-dimensional embedding space of user inputs, wherein each point is associated with one or more different lexical structures corresponding to a user input. In some embodiments, the user input embedding space discussed herein above with respect to the feature extraction compo-nent 142*a* may be associated with both a semantic meaning and a lexical structure corresponding to a user input.

For further example, the feature extraction component(s) 142*a-n* may include a feature extraction component 142*b* configured to process the user input data 127 (e.g., the NLU data) to generate an entity embedding representing the one or more entities included in the user input. The feature extraction component 142*b* may take as input the one or more entities included in the user input (e.g., included in the NLU data in the user input data 127) and may encode the one or more entities to generate the entity embedding represent-ing the one or more entities.

In some embodiments, the entity embedding may corre-spond to one or more points in a multi-dimensional embed-ding space of entities, wherein each point is associated with a named entity (e.g., the White House, Michael Jordan, New York, Barack Obama, etc.). The embedding space may be an N-dimensional space, wherein each dimension of the embedding space corresponds to a dimension (e.g., degree of freedom) of the vector representing an entity. Points in the embedding space near each other may correspond to entities which are similar (e.g., the entities of Paris and Versailles may correspond to points in the embedding space near each other based on them both being cities in France), while points far from each other may correspond to entities which correspond to dissimilar meanings (e.g., the cities of Paris and Michael Jordan (or other persons) may correspond to points in the embedding space far from each other based on their being mostly unrelated). Regions of the embedding space may thus correspond to one or more different entities. In some embodiments, regions of the embedding space may correspond to one or more domains to which different entities may correspond. A first region in the embedding space may, for example, represent entities which correspond to a place (e.g., cities, countries, etc.), while a second region in the embedding space may represent user inputs which correspond to people (athletes, celebrities, politicians, etc.), and so on.

The entity embedding space may be defined by processing entities included in user inputs with an encoder, (e.g., the feature extraction component 142b) such as a trained neural network encoder (e.g., a Transformer such as BERT, GPT, etc.). A first entity may, for example, correspond to "Adele." The entity encoder may process this entity and determine output embedding data that represents the entity "Adele." The point in the embedding space corresponding to the embedded data may then be associated with "Adele." The region in the embedding space corresponding to the embedded data may be associated with a domain of "Music," "Musician," "Celebrity" or the like.

As another example, the feature extraction component(s) 142a-n may include a feature extraction component 142c configured to process the user input data 127 to generate a carrier phrase embedding representing a carrier phrase included in the user input. A carrier phrase, as used herein, may refer to one or more words that are the same, while the other words change based on the semantic meaning of the user input. Example carrier phrases may be "put on . . . ," "get . . . ," "what is . . . ," "set a . . . for . . . ," "play . . . ", "show . . . ", etc.). In some embodiments, carrier phrases may be provided to the system 100 as sample user inputs that can be used to invoke a particular functionality (e.g., intent, domain, skill, etc.) of the system 100. Example carrier phrases "play [entity]" and "show [entity]" may be used to invoke a PlayVideoIntent associated with a video domain. The feature extraction component 142c may take as input a text or tokenized representation of the user input (e.g., included in the ASR data) and encode the user input based on a carrier phrase represented in the user input to generate the carrier phrase embedding representing the carrier phrase.

In some embodiments, the carrier phrase embedding may correspond to one or more points in a multi-dimensional embedding space of carrier phrases, wherein each point is associated with a different carrier phrase. The embedding space may be an N-dimensional space, wherein each dimension of the embedding space corresponds to a dimension (e.g., degree of freedom) of the vector representing the carrier phrase. Points in the embedding space near each other may correspond to carrier phrases with a similar syntactical structure, while points far from each other may correspond to carrier phrases with a dissimilar syntactical structure. Regions of the embedding space may thus correspond to one or more different carrier phrases; a first region in the embedding space may, for example, represent carrier phrases which correspond to "put on . . . " or the like, while phrases which correspond to "put on . . . " or the like, while a second region in the embedding space may representing carrier phrases which correspond to "set a . . . for . . . ."

The carrier phrase embedding space may be defined by processing text data representing a user input including different carrier phrases with an encoder, (e.g., the phrase encoding component 149.) such as a trained neural network encoder (e.g., a Transformer such as BERT, GPT, etc.). First text data may, for example, include a user input including a carrier phrase of "Put on . . . " The encoder may process this text data and determine output embedding data that represents the carrier phrase of "Put on . . . " The point and/or region in the embedding space corresponding to the embedded data may then be associated with the carrier phrase of "Put on . . . " included in the user input.

The one or more features vectors determined by the feature extractors 142a-n may be sent to the clustering component 150. The clustering component 150 may implement a clustering algorithm(s) (e.g., an unsupervised clustering algorithm, such as K-means clustering) for clustering similar data points (e.g., similar user input features) in a common feature space together into clusters or groups (e.g., the clusters 157a-n). The clustering component 150 processes one or more of the features to determine cluster data 158 representing one or more clusters/cluster IDs (e.g., the clusters 157a-n) to which the features of the user input correspond. For example, in an instance where the feature space 155a corresponds to the user input embedding space, the clustering component 150 may process the user input embedding data to assign the user input embedding data to a cluster 157a including one or more similar user input embeddings in the user input embedding space. For further example, in an instance where the embedding space 155b corresponds to the entity embedding space, the clustering component 150 may process the entity embedding data to assign the entity embedding data to a cluster 157b including one or more similar entity embeddings in the entity embedding space. As another example, in an instance where the feature space 155c corresponds to the carrier phrase embedding space, the clustering component 150 may process the carrier phrase embedding data to assign the carrier phrase embedding data to a cluster 157c including one or more similar carrier phrase embeddings in the carrier phrase embedding space. As such, the clustering component 150 may be configured to process one or more of the features included in the feature vector(s) generated by the feature extraction component(s) to assign the one or more features to determine cluster data 158 representing one or more clusters/cluster IDs to which the one or more features of the user input correspond.

In some embodiments, in response to receiving the one or more features associated with the user input data 127, the clustering component 150 may retrieve the one or more clusters from a storage. Thereafter, the clustering component 150 may process the one or more features to assign the one or more features to the one or more clusters. After assigning the one or more features to the one or more clusters, the clustering component 150 may send the clusters to the storage.

After assigning the one or more features associated with the user input, the clustering component may send the cluster data 158 corresponding to the one or more clusters/cluster IDs, to which the one or more features are assigned, to the error detection component 160. In some embodiments, for example, the cluster data 158 may include a first cluster ID corresponding to a first cluster including similar user inputs (e.g., including the current user input and other user inputs determined to be semantically similar to the current user input), a second cluster ID corresponding to a second cluster including similar entities (e.g., including entities included in the current user input similar entities of other user inputs), a third cluster ID corresponding to a third cluster including similar carrier phrases (e.g., including a carrier phrase included in the current user input and similar carrier phrases of other user inputs), etc. For further example, the cluster data 158 may further include cluster IDs corresponding to clusters representing lexically similar user inputs, similar ASR token counts corresponding to user inputs, similar sentiments corresponding to user inputs (e.g., sad, happy, frustrated, etc.), similar language styles (e.g., politeness, formality, etc.,), similar syntax, similar vernacular, similar vocabulary, similar level of lexical diversity of the tokens included in user inputs, similar pitch of audio data corresponding to user inputs, similar utterance scores, similar dialog outcomes, similar ASR boosting features (e.g., ASR confidence score(s), ASR entity token score(s), etc.), similar intent boosting features (e.g., NLU confidence score (s), intent score(s), domain(s), etc.) similar entity recognition boosting features (e.g., NLU entity score(s), etc.), similar context data, similar audio feature (e.g., pitch, frequency, energy band representation, volume, etc.), and other similar features (e.g., a user-perceived error type).

The error detection component 160 processes the cluster data 158 and the user input data 127 (e.g., the ASR data) to generate an error indicator 165 and ranked cluster data 167. The error indicator 165 may represent whether processing with respect to the user input data 127 may result in an error. The error indicator 165 may be a numerical value, Boolean value, an alphanumerical value, a probability/likelihood, or another type of value. For example, the error indicator 165 may be "0" to indicate non-error and "1" to indicate an error. As another example, the error indicator 165 may be a probability value between 0 and 1.

The ranked cluster data 167 may represent one or more features associated with the user input data 127 that are determined to cause the error. For example, the ranked cluster data 167 may be a list including one or more of the clusters 157*a-n*, to which the one or more features associated with the user input data 127 were assigned, where the list may be ranked based on how likely the corresponding features caused an error associated with the processing of the user input data 127. For example, the cluster data 158 may include a first cluster corresponding to user input embeddings, a second cluster corresponding to entity embeddings, and a third cluster corresponding to carrier phrase embeddings and the error detection component 160 may determine that processing with respect to the user input data 127 may result in an error associated with an entity included in the user input data 127, then the ranked cluster data 167 may represent that the feature associated with the second cluster (e.g., the entity embedding) is most likely to have caused the error. In some embodiments, the output of the error detection component 160 may further include one or more values representing likelihoods that the error corresponds to a particular feature.

In some embodiments, the error detection component 160 may output the ranked cluster data 167 and another component of the detection component 130 may determine the error indicator 165 based on the ranked cluster data 167. For example, if the component determines that a value included in the ranked cluster data 167 satisfies a condition (e.g., meets or exceeds a threshold value), then the component may generate the error indicator 165 to represent that processing with respect to the user input data 127 will result in an error. For further example, if the component determines that no value included in the ranked cluster data 167 satisfies the condition (e.g., meets or exceeds a threshold value), then the component may generate the error indicator 165 to represent that processing with respect to the user input will not result in an error.

In some embodiments, the error detection component 160 may implement an ML model, for example, a classifier. For example, the ML model may be configured to process the user input data 127 and the cluster data 158 and generate the ranked cluster data 167 and/or the error indicator 165. The ML model may be trained on various positive and negative training examples of user inputs and corresponding features (or the clusters that the features were assigned to) so the ML model may be capable of determining a likelihood that a given feature (or cluster) will cause an error. In some embodiments, the training data for the ML model may include sample user inputs labeled with a corresponding error label, where the error label indicates whether processing, by the system 100, with respect to the sample user input resulted in an error or not. The error label may be generated by another component (e.g., implementing a machine learning model(s), a statistical model(s), a rules engine(s), etc.) of the system 100 configured to process user inputs and generate the error label indicating whether the processing, by the system 100, with respect to the sample user input resulted in an error or not. In some embodiments, the error label may indicate a likelihood that processing, by the system 100, with respect to the sample user input resulted in an error or not and an indicator of the error that likely occurred (e.g., a NLU error score of 0.8). Based on this training data, the ML model may classify individual clusters 157 in the cluster data 158 as likely to result in an error or not. In some embodiments, the sample user inputs in the training data may be text data, token data, text embedding data, or other type of data. In other embodiments, the training data may include sample entities labeled with a corresponding error label, sample carrier phrases labeled with a corresponding error label, etc.

In some embodiments, the error detection component 160 may use class-based term frequency-inverse document frequency (c-TF-IDF) on the clusters represented by the cluster data 158 to extract relevant information about the features represented by the clusters. For example, during training, an ML model of the error detection component 160 may take as input a text or tokenized representation of a user input, processing of which is known to result in an error, and one or more features associated with the user input (or cluster IDs of the clusters that the features were assigned to), and may be tasked with determining whether processing with respect to the user input will result in an error and, if so, ranking the one or more features based on how likely the features are to have caused the error. In other words, the error detection component 160 may process the user input and each of the one or more features to generate a score (e.g., a value between 0 and 1) representing a likelihood that the feature being associated with the user input represents that processing with respect to the user input will result in an error. The output of the error detection component 160 may be a ranked list of the features based on the likelihoods. In some embodiments the ML model may be a logistic regression-based classifier. In some embodiments, the error detection component 160 may rank the one or more features using SHapley Additive explanations (SHAP).

In some embodiments, the score output by the error detection component 160 may be associated with a particular error (e.g., ASR processing error, NLU processing, etc.) In other embodiments, if the error detection component 160 determines that the processing with respect to a user input will result in an error, the error detection component 160 may send the user input (e.g., the user input data 127) and the cluster data 158 to another component of the system 100 for further processing, including to determine a particular error that will likely result from processing of the user input (e.g., ASR processing error, NLU processing error, etc.). In other embodiments, the detection component 130 (or another component of the system 100) may be configured to determine the particular error associated with the user input based on a top ranked feature being associated with a particular type of processing (e.g., features extracted from the ASR data (e.g., a lexical diversity feature, etc.) being associated with ASR processing, features extracted from the NLU data (e.g., an entity embedding feature, etc.) being associated with NLU processing).

The detection component 130 may send data related to the processing of the user input data 127 to storage. For example, the detection component 130 may send the ASR data, NLU data, context data, one or more of the features included in the feature vector(s) cluster data 158, the error indicator 165, the ranked cluster data 167, an indication of the particular error that will result from processing of the user input, etc. to data storage.

In some embodiments, the error detection component 160 may process the user input data 127 and the one or more features of the user input data 127, instead of the cluster data 158, to generate the error indicator 165 and ranked feature data (not illustrated), where the ranked cluster data 167 corresponds to a ranking of the one or more features based on a likelihood that the one or more features caused the error.

In some embodiments, the processing of the detection component 130 may be performed periodically (e.g., in 12-month intervals) on a batch of user inputs. For example, the detection component 130 may receive multiple instances of user input data 127 corresponding to current (e.g., live traffic) user inputs received by the system component(s) 120. The detection component 130 may process user input data corresponding to the user input as described herein to determine whether processing of one or more of the user inputs will result in an error and determine a list of feature clusters associated with the user inputs corresponding to a ranked likelihood that the features represented by the clusters caused the error.

Figure 2:
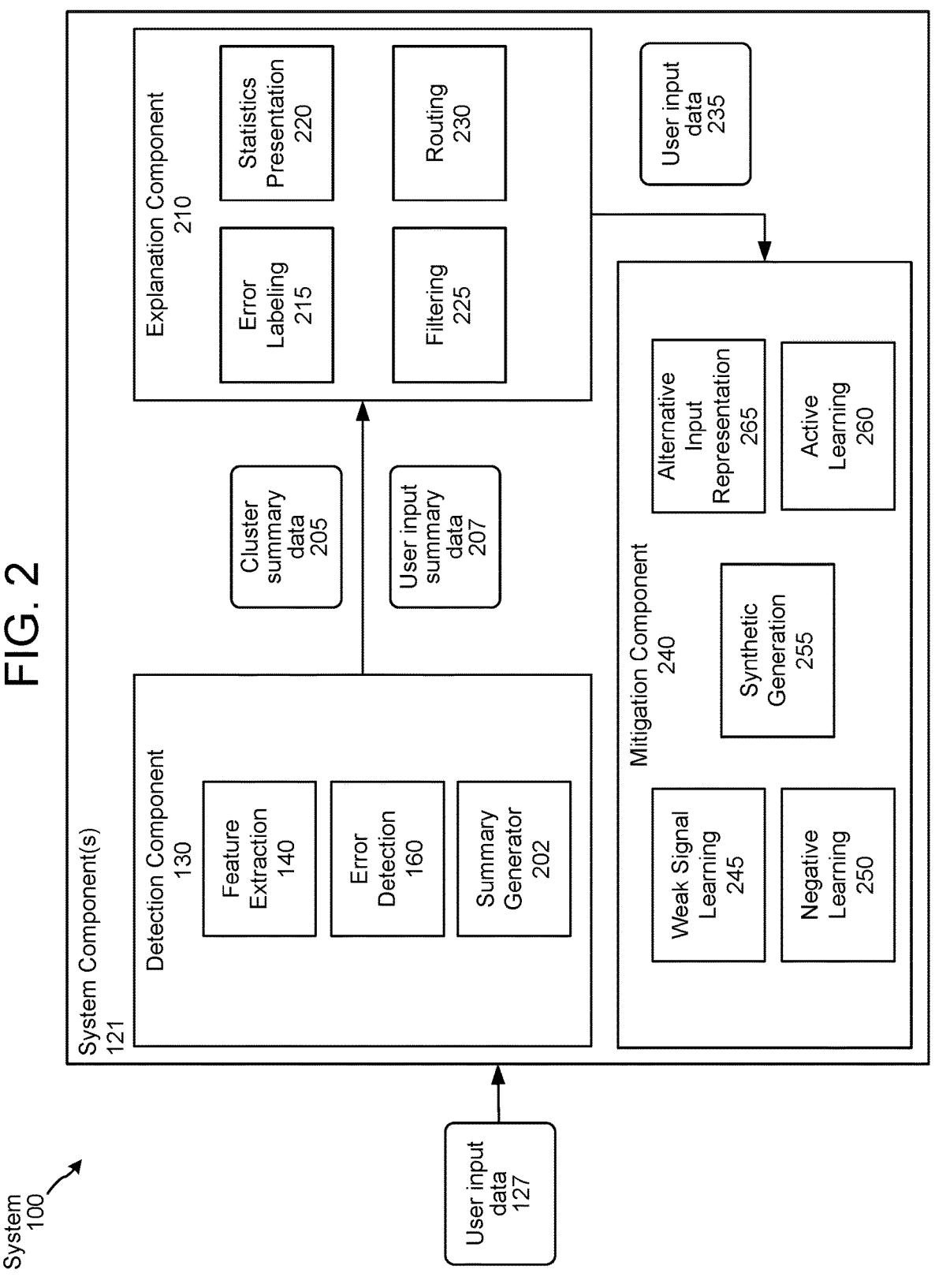
FIG. 2 is a conceptual diagram illustrating a system for detecting, explaining, and mitigating one or more errors determined to result from processing of one or more user inputs, according to embodiments of the present disclosure.

In some embodiments, after the detection component 130 has processed a number of current (e.g., live traffic) user inputs (e.g., a number that meets or exceeds a threshold number of user inputs, after training of the ML model of the error detection component 160 is complete, etc.), the detection component 130 may output cluster summary data (e.g., such as the cluster summary data 205, as shown in FIG. 2) and/or user input summary data (e.g., such as the user input summary data 207, as shown in FIG. 2).

The cluster summary data may represent one or more clusters representing features associated with user inputs processed by the detection component 130. In some embodiments, the clusters in the cluster summary data may be ranked based on how often the features included in the clusters have been determined to cause (or would cause) an error with respect to processing of a corresponding user input. For example, in some embodiments, the cluster summary data may represent a cluster that has been disproportionately (e.g., compared to other clusters) determined to include features that have been determined to cause an error associated with processing of corresponding user inputs. Such a determination may represent that the processing by a component associated with the errors may continue to result in an error when processing user inputs including features similar to those included in the clusters. This may indicate a pattern of error (e.g., an error with respect to ASR processing of user inputs including particular words, an error with respect to NLU processing of user inputs including particular carrier phrases or entities, an error with respect to processing of user inputs associated with a particular context, etc.) In some embodiments, the cluster summary data 205 may include various data related to the one or more clusters. For example, the cluster summary data 205 may include, for a cluster, a cluster ID, an importance ranking (e.g., a value representing the percentage of the total number of errors detected by the detection component 130 (over a period of time, such as since the last cluster summary data has been generated) that have been attributed to a feature represented by the cluster), average user experience metrics (e.g., a percentage of user inputs/features assigned to the cluster that are determined to cause an error), a number of user inputs included in/associated with (e.g., are associated with a feature that is assigned to) the cluster, a percentage of user inputs processed by the detection component 130 that are represented in the cluster, one or more example intents corresponding to the user inputs, one or more topic(s) represented in the user inputs, text or tokenized representations of one or more user inputs included in the clusters (including, optionally, a count representing how many times the user input has been received and has been determined to result in an error), etc. In some embodiments, one or more portions of the data included in the cluster summary data 205 may be received from another component of the system 100.

The user input summary data 207 may include various data related to the user inputs processed by the detection component 130 including the error indicator and the ranked cluster data. For example, the user input summary data 207 may include, for a given user input processed by the detection component 130, a unique identifier for the user input, a text or token representation of the user input, the error indicator 165, one or more values representing a likelihood that the error corresponds to a particular error type (e.g., ASR processing, NLU processing, etc.), a user perceived defect value (e.g., a likelihood that the user perceived the error), one or more labels representing the error, a wakeword confidence value (e.g., a value representing a confidence that a wakeword was detected in the user input), one or more of the features extracted from the user input (e.g., features associated with the audio data, ASR data, NLU data, context data, etc. as discussed herein above), indicators of the one or more clusters that features of the user input were assigned to (e.g., a cluster ID), an indicator representing whether the user input includes offensive language, etc. In some embodiments, one or more portions of the data included in the user input summary data 207 may be received from another component of the system 100.

In some situations, the detection component 130 may output cluster summary data 205 and/or user input summary data 207 periodically (e.g., in 12-month intervals, after processing a batch of user inputs, after processing each user input, etc.). In the situation where the detection component 130 outputs cluster summary data 205 and/or user input summary data 207 after processing a user input, the cluster summary data 205 may include various data related to the one or more clusters represented in the ranked cluster data and the user input summary data 207 may include various data related to the current user input.

In some embodiments, one or more portions of the cluster summary data 205 and/or the user input summary data 207 may be generated by a summary generator component 202 (illustrated in FIG. 2). The summary generator component 202 may include one or more components configured to process one or more user inputs and/or clusters to generate one or more portions of the cluster summary data 205 (e.g., one or more components configured to determine the importance ranking, the average user experience metrics, the number of user inputs included in/associated with the cluster, the percentage of user inputs processed by the detection component 130 that are represented in the cluster, one or more example intents corresponding to the user inputs, one or more topic(s) represented in the user inputs, text or tokenized representations of one or more user inputs included in the clusters, etc.). For example, the summary generator component 202 may include a component configured to process a cluster to determine one or more (top-n) example topics associated with the user inputs included in the cluster (e.g., a topic modeling component). The topic modeling component may parse the user input(s) included in the cluster to determine one or more topics (e.g., one or more words, phrases, entities, etc.) that are most often included in the user inputs. In some embodiments, the summary generator component 202 may aggregate data for determining the one or more portions of the cluster summary data 205 from one or more other components of the system 100. For example, the summary generator component 202 may query the data storage discussed above for the data determined during processing of the detection component 130.

The summary generator component 202 may include one or more components configured to process one or more user inputs processed by the error detection component 160 to generate one or more portions of the user input summary data 207 (e.g., the unique identifier for the user input, a text or token representation of the user input, the error indicator 165, one or more values representing a likelihood that the error corresponds to a particular error type (e.g., ASR processing, NLU processing, etc.), a user perceived defect value (e.g., a likelihood that the user perceived the error), one or more labels representing the error, a wakeword confidence value (e.g., a value representing a confidence that a wakeword was detected in the user input), one or more of the features extracted from the user input (e.g., features associated with the audio data, ASR data, NLU data, context data, etc. as discussed herein above), indicators of the one or more clusters that features of the user input were assigned to (e.g., a cluster ID), an indicator representing whether the user input includes offensive language, etc. In some embodiments, the summary generator component 202 may aggregate the data for the one or more portions of the user input summary data 207 one or more other components of the system 100. For example, the summary generator component 202 may query the data storage discussed above for the data determined during processing of the detection component 130.

The summary generator 202 may receive data from another component including information related to individual user inputs that are processed by the detection component 130. For example, such data may include similar information as the user input data 127 (e.g., ASR data, NLU data, context data, etc.). In some embodiments, the received data may also include an error label associated with individual user inputs. The error label may be determined by another error determination component and may indicate whether processing of the associated user input resulted in an error (e.g., an undesired response to the user input); in case of an error, the error label may also indicate an error type (e.g., ASR processing, NLU processing, skill routing, etc.). In generating the user input summary data 207, the summary generator 202 may include the error label associated with the individual user inputs. In generating the cluster summary data 205, the summary generator 202 may include the error label associated with the individual user inputs of a cluster. Such error labels may be used by the explanation component 210 to determine/infer additional information regarding the clusters 157.

FIG. 2 illustrates example components and processing of the system component(s) 121, according to embodiments of the present disclosure. As shown in FIG. 2, the detection component 130 (e.g., the summary generator component 202) may output and send the cluster summary data 205 and the user input summary data 207 to an explanation component 210. The explanation component 210 may include various components, such as an error labeling component 215, a statistics presentation component 220, a filtering component 225, and a routing component 230.

Figure 5:
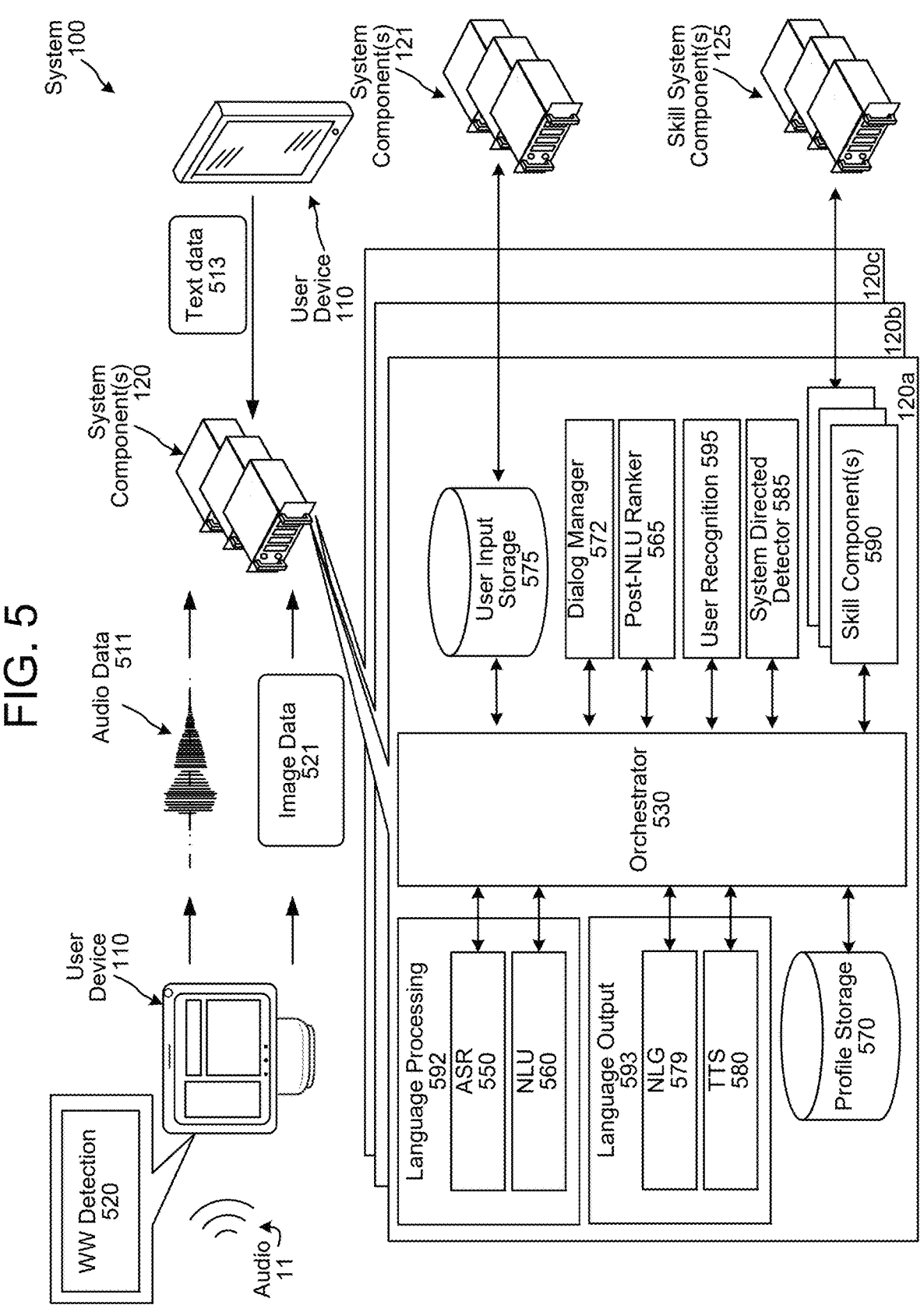
FIG. 5 is a conceptual diagram of components of the system, according to embodiments of the present disclosure.

The explanation component 210 may be configured to determine which component, for example of the system component(s) 120 shown in FIG. 5, is likely to cause an error based on the information included in the cluster summary data 205 and/or the user input summary data 207. Further details on the explanation component 210 are described below in relation to FIG. 3. Based on the determined component, the explanation component 210 may select a mitigation strategy for remedying the error. A mitigation strategy may correspond to one or more actions taken by the system 100 with respect to a component that is associated with the error (e.g., retraining of the component and/or model, etc.). The explanation component 210 may select one or more user inputs from the cluster(s) represented in the cluster summary data 205, generate user input data 235 including the user inputs (e.g., data related to the user inputs, including audio data, ASR data, NLU data, context data, extracted features, etc.), and send the user input data 235 to the mitigation component 240.

As shown in FIG. 2, the mitigation component 240 may include various components, such as a weak signal learning component 245, a negative learning component 250, a synthetic generation component 255, an active learning component 260, and an alternative input representation component 265.

The mitigation component 240 may be configured to execute a mitigation strategy selected by the explanation component 210 with respect to the component associated with the error and the user input data 235. For example, the mitigation component 240 may be configured to generate a training data set based on the user inputs included in the user input data 235 for training the component associated with the error type.

Figure 3:
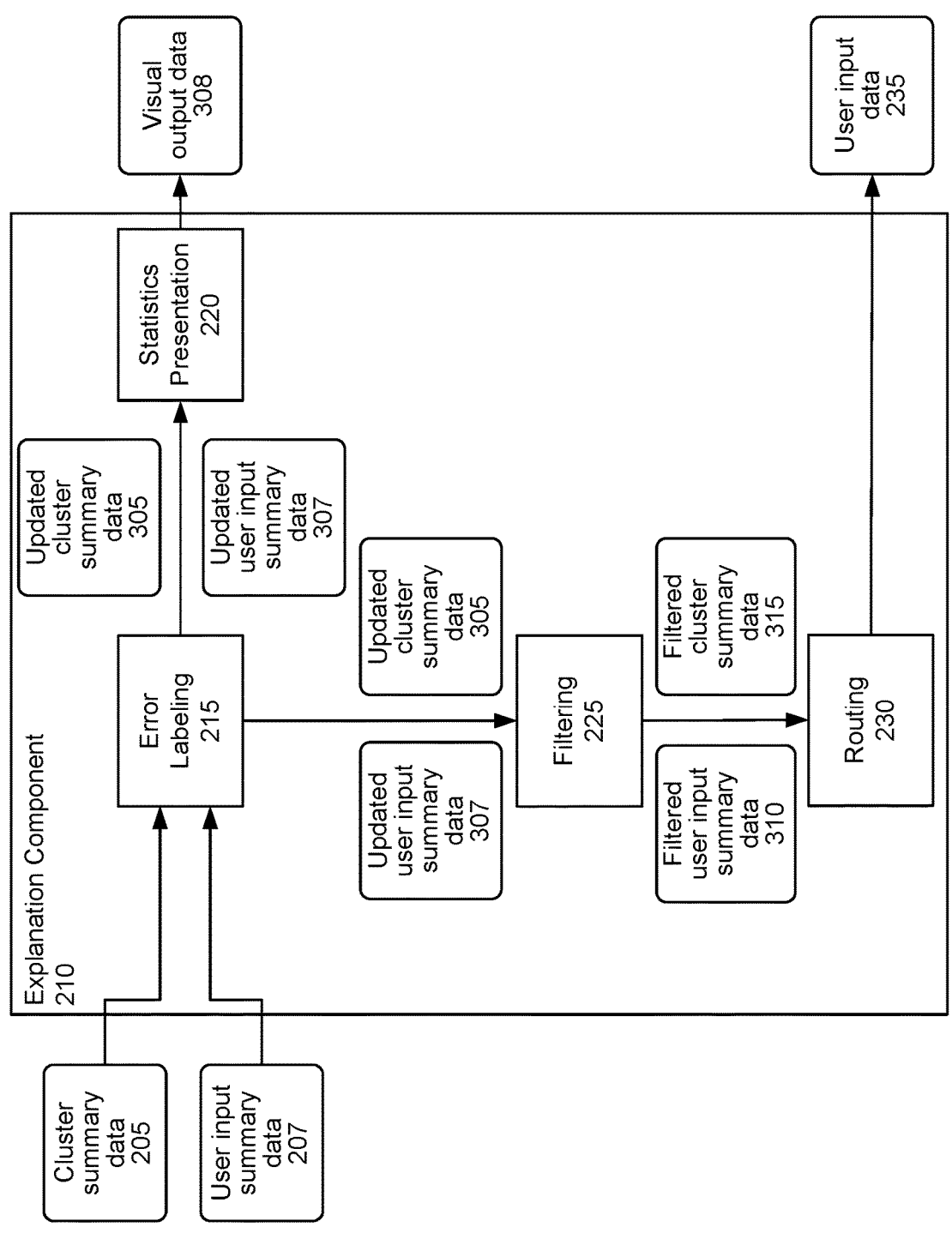
FIG. 3 is a conceptual diagram illustrating example processing performed by an explanation component used for determining an explanation for why processing with respect to a user input is determined to result in an error, according to embodiments of the present disclosure.

FIG. 3 illustrates example processing of the explanation component 210. As shown in FIG. 3, the cluster summary data 205 and the user input summary data 207 are received by the error labeling component 215 of the explanation component 210. The error labeling component 215 processes the cluster summary data 205 and the user input summary data 207 to determine an explanation for why processing with respect to one or more user inputs included in a cluster will result in an error. For example, as discussed above, the cluster summary data 205 and/or the user input summary data 207 may include one or more values representing likelihoods that a user input included in the cluster is associated with a particular type of error (e.g., ASR processing, NLU processing, etc.). The error labeling component 215 of the explanation component 210 may use the value(s) to determine a particular type of error associated with the user inputs included in the cluster. For further example, the error labeling component 215 may use information related to the top intents, patterns, or user inputs (e.g., included in the cluster summary data 205 and the user input summary data 207) to determine further details associated with the type of error associated with the user inputs included in the cluster.

As such, using the cluster summary data 205 and the user input summary data 207, the error labeling component 215 may generate updated cluster summary data 305 and updated user input summary data 307 corresponding to the cluster summary data 205 and the user input summary data 207, respectively, but further including a text or other type of explanation of why the detection component 130 determined that processing with respect to the user input(s) will result in an error. For example, the explanation may indicate [Domain1] mapped to [Domain2], [Intent1] mapped to [Intent2], etc. In some embodiments, the explanation may include one or more error types to which the error relates (e.g., ASR error, NLU error, user error, entity resolution error, result error, wrong domain, wrong intent, false wakeword detection, etc.). In other words, the error labeling component 215 may use the cluster summary data 205 and the user input summary data 207 to generate an explanation for why processing of one or more user inputs included in a cluster were determined to result in an error.

In some embodiments, the error labeling component 215 may be configured to aggregate various data associated with one or more user inputs included in a cluster in order to generate the explanation of why the detection component 130 determined that processing with respect to the user input(s) will result in an error. As such the explanation may represent an explanation of why the detection component 130 determined that processing with respect to an average user input included in the cluster will result in an error. For example, the error labeling component 215 may process the user input summary data 207 to aggregate, for each user input included in a given cluster, the one or more values representing a likelihood that the error corresponds to a particular error type (e.g., ASR processing, NLU processing, etc.). The error labeling component 215 may process the one or more values to determine an average likelihood that an error associated with the cluster corresponds to a particular error type (e.g., ASR processing, NLU processing, etc.). The error labeling component 215 may use the average likelihood to generate the explanation for the user input(s) and/or cluster.

In some embodiments, the explanation may include an indicator used for filtering and/or selection of a mitigation strategy associated with the user input and/or cluster. For example, in some embodiments, the explanation may include an "inconclusive" indicator. An "inconclusive" indicator may represent that the error resulting from processing of a user input (or one or more features of the user input) is due to the user input (or one or more of the features of the user input) not being supported (e.g., cannot properly be processed) by the system (and/or a component/model associated with the error), such that processing of such a user input (or one or more features of the user input) will always result in the error. For example, if the user input includes an entity that is not supported by the system 100, the system will be unable to resolve the entity during processing. As another example, if the user input includes one or more words in a language not supported by the system, then processing of the user input will result in an error. The resulting error may be determined to correspond to an "inconclusive" error type because the entity or language, for example, are not supported by the system and, therefore, the system is unable to properly process the user input. In some embodiments, such an indicator may be determined by a user. For example, the explanation component 210 may be configured to output the cluster summary data 205 and/or the user input summary data 207 to a user (e.g., a developer, an error annotation expert, etc.), where the user may provide an input to the system 100 including the indicator discussed above for one or more of the user inputs and/or clusters included in the cluster summary data 205 and/or the user input summary data 207. In some embodiments, other indicators provided by a user may include "not fit for augmentation" representing that the user input and/or cluster is not to be used as part of a mitigation strategy including augmenting a training set for a component/model associated with an error, "fit for ASR rewrite" representing that the user input and/or cluster should be used as part of mitigation strategy including rewriting ASR data associated with the user input(s), as discussed herein below, or other indicators representing an example error associated with the user inputs and/or clusters (e.g., [Domain1] mapped to [Domain2], [Intent1] mapped to [Intent2], etc.).

In some embodiments, the error labeling component 215 may implement a ML model. For example, the ML model may be configured to process a portion of the cluster summary data 205 corresponding to a cluster and portions of the user input summary data 207 corresponding to one or more user inputs included in the cluster to generate an explanation for why processing of the one or more user inputs included in the cluster was determined to result in an error.

In some embodiments, the error labeling component 215 (or another component of the explanation component 210) may be configured to determine whether the determination by the error detection component 160 that processing of a particular user input will result in an error is associated with an annotation bias. For example, the error labeling component 215 (or the other component of the explanation component 210) may compare the error indicator (e.g., the error indicator 165) generated by the error detection component 160 to training error labels for similar user inputs processed during training of the error detection component 160. If the error indicator for a user input is not similar to a training error label for a similar user input processed during training, then the error labeling component 215 may determine that the error detection component 160's determination with respect to the particular user input may suffer from an annotation bias and may specify that the error associated with the user input and/or associated cluster is associated with the annotation bias in the updated cluster summary data 305 and/or updated user input summary data 307. In some embodiments, the error labeling component 215 may determine a similarity score (e.g., a semantic similarity, etc.) between the particular user input and the user input processed during training. If the similarity score satisfies a condition (e.g., meets or exceeds a threshold) and the error indicator is not the same as the training error label, the error labeling component 215 may determine there is annotation bias. On the other hand, if the similarity score fails to satisfy a condition (e.g., fails to meet the threshold), the error labeling component 215 may determine the explanation for the user input/associated cluster does not suffer from annotation bias. In some embodiments, the filtering component 225 may filter out the user input/associated cluster from further processing based on the annotation bias. In other embodiments, the explanation component 210 may use one or more user inputs of the cluster to further train the error detection component 160.

In some embodiments, the error labeling component 215 (or another component of the explanation component 210) may be configured to determine whether the determination by the error detection component 160 that processing of a particular user input will result in an error is associated with a sampling bias. In other words, the error labeling component 215 may determine that the determination of error by the error detection component 160 may be inaccurate based on the user input being underrepresented in training data used to train the error detection component 160. For example, the error labeling component 215 (or another component of the explanation component 210) may compare one or more user inputs of a cluster (or the corresponding features) to one or more training user inputs (or the corresponding training features) (e.g., user inputs (or corresponding features) processed by the error detection component 160 during training). If at least one of the one or more user inputs (or corresponding features) of a cluster are not similar (e.g., semantically or lexically similar) to any (or at least a threshold number) of the training user inputs, then the error labeling component 215 may determine that the determination of error by the error detection component 160 with respect to the one or more user inputs (or the cluster) suffers from a sampling bias (e.g., the type of user input was undersampled during training, therefore the error detection component 160 may not be able to properly process with respect to the user input) and the error labeling component 215 may specify that the error associated with the user input and/or cluster is associated with a sampling bias in the updated cluster summary data 305 and/or the updated user input summary data 307. In some embodiments, the explanation component 210 may filter out the cluster from further processing based on the sampling bias. In other embodiments, the explanation component 210 may use one or more user inputs of the cluster to further train the error detection component 160.

The error labeling component 215 may send the updated cluster summary data 305 and the updated user input summary data 307 to the statistics presentation component 220 and/or the filtering component 225. In some embodiments, the error labeling component 215 may only send subsets of the updated cluster summary data 305 and the updated user input summary data 307 corresponding to the top ranked (e.g., top-n) clusters/user inputs determined to be associated with an error to the statistics presentation component 220 and/or the filtering component 225.

The statistics presentation component 220 may be configured to process the updated cluster summary data 305 and the updated user input summary data 307 to generate visual output data 308 to be presented to a user. The visual output data 308 may correspond to a visual representation of the updated cluster summary data 305 and the updated user input summary data 307. In some embodiments, the visual output data 308 may include interactive content (e.g., a graphical user interface (GUI)) including data from the updated cluster summary data 305 and updated user input summary data 307. For example, the visual output data 308 may include a representation of a geographic location associated with user inputs included in a cluster, a domain associated with the user inputs included in the cluster, device types of the devices processing with respect to user inputs, the natural language representation of the error resulting from processing of the user inputs, a number of users associated with the user inputs included in the cluster, etc.

The filtering component 225 may process the updated user input summary data 307 and the updated cluster summary data 305 to generate filtered cluster summary data 315 including a subset of the clusters of the updated cluster summary data 305 and filtered user input summary data 310 including a subset of the user inputs of the updated user input summary data 307. The filtering component 225 may filter out user inputs and/or clusters in view of one or more filtering conditions, based on information included in the updated cluster summary data 305 and/or the updated user input summary data 307, etc. For example, a user input and/or a cluster may be filtered out based on the filtering component 225 determining that the user input and/or the user inputs included in the cluster corresponds to a partial user input (e.g., does not include any entities; is not a complete sentence; etc.). For further example, a user input and/or cluster may be filtered out based on the filtering component 225 determining that the user input(s) includes offensive language (e.g., profanity). For further example, a user input (or entire cluster) may be filtered out based on the filtering component 225 determining that the error associated with processing of the user input and/or the user inputs included in the cluster corresponds to the user input(s) not being supported by the system component(s) 120. As an even further example, a user input (or entire cluster) may be filtered out based on the filtering component 225 determining that the error associated with processing of the user input and/or the user inputs included in the cluster includes an indicator of "inconclusive," as discussed above.

After filtering out the one or more user inputs and/or clusters, the filtering component 225 may generate and send the filtered user input summary data 310 and the filtered cluster summary data 315 to the routing component 230.

For a cluster included in the filtered cluster summary data 315, the routing component 230 may determine to use a mitigation strategy for generating a training set (e.g., generating a new training dataset, modifying a previously used training dataset, etc.) associated with a component corresponding to the error in order to remedy the error. Based on the selected mitigation strategy, the routing component 230 may further select one or more user inputs of the cluster from the filtered user input summary data 310 that are to be sent to the mitigation component 240 to generate the training dataset. In some embodiments, the routing component 230 may determine to use more than one mitigation strategy, and therefore may select multiple user inputs, based on the selected strategies, to generate multiple training sets associated with one or more components corresponding to the error. Along with the user input data 235, the routing component 230 may also output (or include in the user input data 235) an indication(s) of a mitigation strategy(ies) to be used.

The particular mitigation strategy selected by the routing component 230 and the corresponding user inputs selected to be sent to the mitigation component 240 may be based on the filtered cluster summary data 315 and the filtered user input summary data 310. The routing component 230 may use the filtered cluster summary data 315 to identify the top ranked clusters in terms of processing error, as well as the corresponding top ranked error types. The routing component 230 may use the filtered user input summary data 310 to select one or more user inputs of the identified clusters to be used as part of the mitigation strategy. The routing component 230 may send the user input data 235 corresponding to the one or more selected user inputs to the mitigation component 240 for processing.

Figure 4:
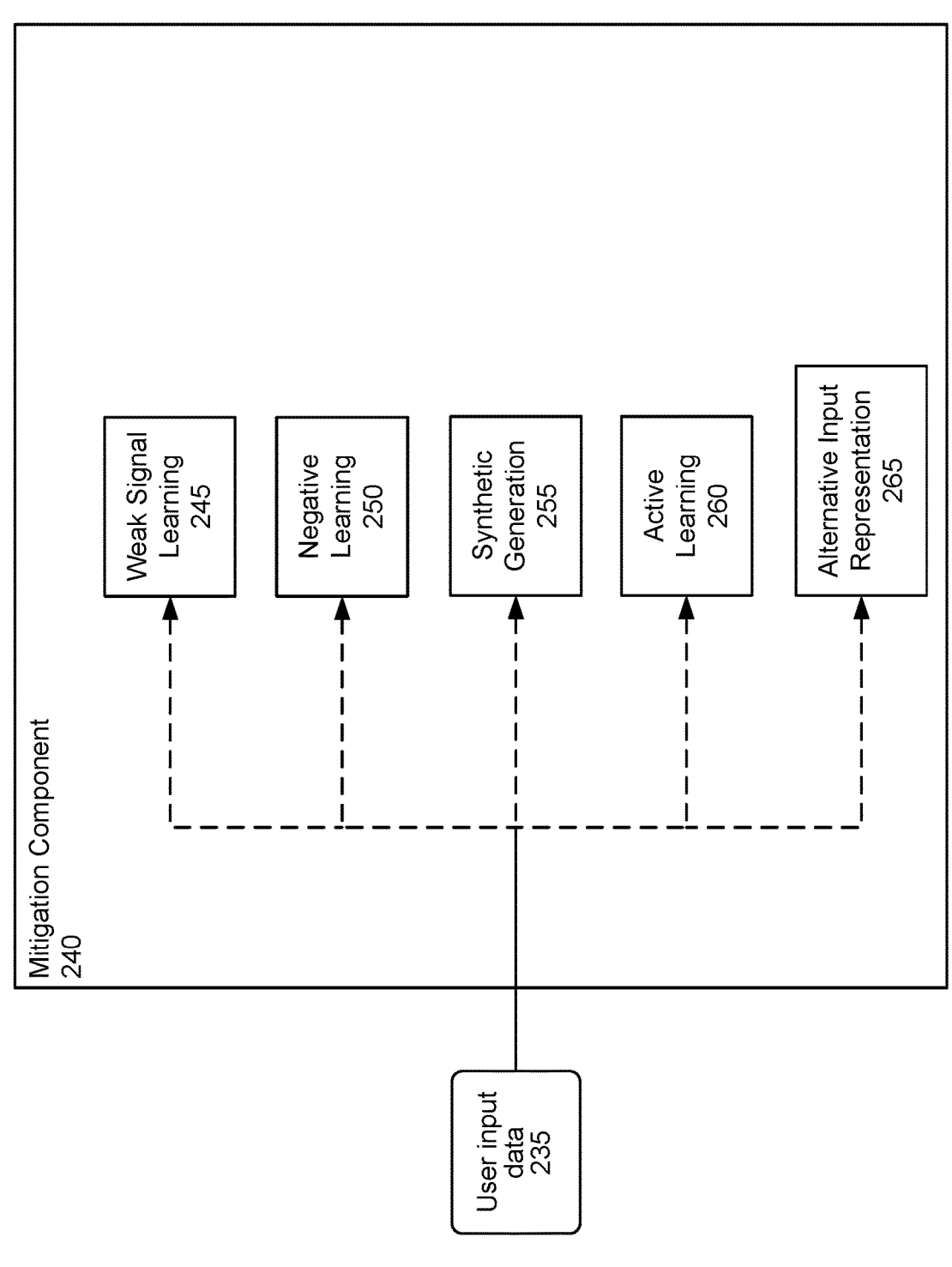
FIG. 4 is a conceptual diagram illustrating example processing performed by a mitigation component used for remedying errors associated with the processing of one or more components of the system, according to embodiments of the present disclosure.

For example, with respect to FIG. 4, the routing component 230 may select an active learning mitigation strategy (e.g., executed by the active learning component 260) and determine one or more user inputs to be sent to the active learning component 260. The active learning component 260 may be configured to generate a training dataset associated with a particular component of the system component(s) 120 using one or more user inputs that are determined to correspond to a particular error. The routing component 230 may select the active learning mitigation strategy based on, for example, based on determining, using the filtered cluster summary data 315, that a cluster is associated with an error. Using the filtered user input summary data 310, the routing component 230 may select one or more user inputs included in the cluster that are determined to result in an error and include an NLU interpretation score within a particular range, and send them to the mitigation component 240.

For further example, the routing component 230 may select a weak signal mitigation strategy (to be executed by the weak signal learning component 245) and determine one or more user inputs to be sent to the weak signal learning component 245. The weak signal learning component 245 may be configured to generate a training data set associated with a particular component of the system using one or more user inputs that are included in the same cluster as user inputs associated with an error, but are not determined to be associated with the error themselves. In other words, the routing component 230 may use the filtered cluster summary data 315 to identify a cluster determined to be associated with an error, use the filtered user input summary data 310 to select one or more user inputs included in the cluster that are determined to not result in an error and include an NLU interpretation score within a particular range, and send the selected user input(s) to the mitigation component 240.

For further example, the routing component 230 may select a negative learning mitigation strategy (to be executed by the negative learning component 250) and determine one or more user inputs to be sent to the negative learning component 250. The negative learning component 250 may be configured to generate a training dataset associated with a particular component of the system 100 to include one or more negative training examples corresponding to one or more user inputs of a cluster determined to correspond to a particular type of error. For example, using the filtered user input summary data 310, the routing component 230 may select one or more user inputs to be sent to the negative learning component 250 based on the one or more user inputs being associated with an "incorrect domain" error. In some embodiments, the one or more user inputs may be selected based on them being associated with a particular example of an error (e.g., an "incorrect domain" error where the "shopping" domain was selected instead of the "music" domain).

For further example, the routing component 230 may determine to use a synthetic data generation mitigation strategy (to be executed by a synthetic generation component 255) and determine one or more user inputs to be sent to the synthetic generation component 255. The routing component 230 may determine to use the synthetic data generation mitigation strategy based on determining that a cluster includes unique user inputs. For example, the routing component 230 may select one or more user inputs from a cluster that was determined to be associated with a sampling bias. The synthetic generation component 255 may be configured to generate additional user inputs (e.g., machine-generated user inputs) that are similar to the one or more user inputs of the cluster and generate a training set to include the generated additional user inputs.

For further example, the routing component 230 may determine to use an alternative input representation mitigation strategy (to be executed by an alternative input representation component 265) and determine one or more user inputs to be sent to the alternative input representation component 265. The routing component 230 may select one or more user inputs that are determined to result in an ASR error and send them to the alternative input representation component 265. The alternative input representation component 265 may be configured to determine how to rewrite a user input such that the user will receive a desired response to the user input, rather than an undesired response. The alternative input representation component 265 may determine whether processing of the user input (e.g., NLU processing of the corresponding ASR output) will result in an error condition (e.g., some system state indicating unsatisfactory processing of data, such as NLU processing of an ASR output not satisfying a threshold confidence, where an error condition may result in a system output resulting in an unsatisfactory user experience), and based thereon may determine an alternative representation of the user input (e.g., a rewrite of the user input) that does not result in such an error condition. For example, the alternative input representation component 265 may determine to rewrite the user input "Play the new sing by a dell" to "Play the new song by Adele," based on determining such a rewrite will result in a desired response to the user input. For further example, the alternative input representation component 265 may determine to rewrite of the user input "lock the from door" to "lock the front door," based on determining such a rewrite will result in a desired response to the user input.

In some embodiments, the routing component 230 may implement an ML model (e.g., a knowledge-based decision tree) configured to determine one or more mitigation strategies to apply to one or more clusters and to select, based on the mitigation strategy(ies) one or more user inputs of the cluster(s) to be sent to the mitigation component 240 for processing.

In some embodiments, the system component(s) 121 may cause the processing with respect to one or more of the detection component 130, the explanation component 210, and the mitigation component 240 to be performed. For example, the system component(s) 121 may cause processing with respect to just the detection component 130 to be performed to determine whether processing with respect to a received user input will result in an error and which feature associated with the user input is most likely to have caused the error. For further example, the system component(s) 121 may cause processing with respect to just the detection component 130 and the explanation component 210 to be performed to process one or more received user inputs and to present output data to a user (e.g., a system administrator, a system developer, etc.) representing whether processing with respect to the user input(s) will result in an error and which features associated with the user input(s) are most likely to have caused the error (among other information). As another example, the system component(s) 121 may cause processing with respect to the explanation component 210 and the mitigation component 240 to be performed using information associated with user inputs previously processed by the detection component 130 to execute mitigation strategies using one or more of the user inputs.

The system 100 may operate using various components as described in FIG. 5. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s). In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of user device 110. Other input forms may include indication that the user has pressed a physical or virtual button on user device 110, the user has made a gesture, etc. The user device 110 may also capture images using camera(s) 718 of the user device 110 and may send image data 521 representing those image(s) to the system component(s). The image data 521 may include raw image data or image data processed by the user device 110 before sending to the system component(s). The image data 521 may be used in various manners by different components of the system to perform operations such as determining whether a user is directing an utterance to the system, interpreting a user command, responding to a user command, etc.

The wakeword detection component 520 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confu-sion networks. Another approach for wakeword detection builds HMMs for each wakeword and non-wakeword speech signals, respectively. The non-wakeword speech includes other spoken words, background noise, etc.

There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520 and/or input is detected by an input detector, the user device 110 may "wake" and begin transmitting audio data 511, representing the audio 11, to the system component(s) 120. The audio data 511 may include data corresponding to the wakeword; in other embodiments, the portion of the audio corresponding to the wakeword is removed by the user device 110 prior to sending the audio data 511 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 520 may result in sending audio data to system component(s) 120a for processing while detection of the wakeword "Computer" by the wakeword detection component may result in sending audio data to system component(s) 120b for processing. The system may have a separate wakeword and system for different skills/systems (e.g., "Dungeon Master" for a game play skill/system component(s) 120c component(s) c) and/or such skills/systems may be coordinated by one or more skill component(s) 590 of one or more system component(s) 120.

The user device 110 may also include a system directed input detector 685. (The system component(s) may also include a system directed input detector 585 which may operate in a manner similar to system directed input detector 685.) The system directed input detector 685 may be configured to determine whether an input to the system (for example speech, a gesture, etc.) is directed to the system or not directed to the system (for example directed to another user, etc.). The system directed input detector 685 may work in conjunction with the wakeword detection component 520. If the system directed input detector 685 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 685 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 685 is determining whether an input is potentially device directed. For example, the system may output an orange indicator while considering an input, and may output a green indicator if a system directed input is detected. Other such configurations are possible.

Upon receipt by the system component(s) 120, the audio data 511 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 may send the audio data 511 to a language processing component 592. The language processing component 592 (sometimes also referred to as a spoken language understanding (SLU) component) includes an automatic speech recognition (ASR) component 550 and a natural language understanding (NLU) component 560. The ASR component 550 may transcribe the audio data 511 into text data. The text data output by the ASR component 550 represents one or more than one (e.g., in the form of an N-best list) ASR hypotheses representing speech represented in the audio data 511. The ASR component 550 interprets the speech in the audio data 511 based on a similarity between the audio data 511 and pre-established language models. For example, the ASR component 550 may compare the audio data 511 with models for sounds (e.g., acoustic units such as phonemes, senons, phones, etc.) and sequences of sounds to identify words that match the sequence of sounds of the speech represented in the audio data 511. The ASR component 550 sends the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein.

The language processing system 592 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the user device 110, the system component(s) 120, a skill component 590, a skill system component(s) 125, etc.) to execute the intent. For example, if the text data corresponds to "play the 5th Symphony by Beethoven," the NLU component 560 may determine an intent that the system output music and may identify "Beethoven" as an artist/composer and "5th Symphony" as the piece of music to be played. For further example, if the text data corresponds to "what is the weather," the NLU component 560 may determine an intent that the system output weather information associated with a geographic location of the user device 110. In another example, if the text data corresponds to "turn off the lights," the NLU component 560 may determine an intent that the system turn off lights associated with the user device 110 or the user 105. However, if the NLU component 560 is unable to resolve the entity—for example, because the entity is referred to by anaphora such as "this song" or "my next appointment"—the language processing system 592 can send a decode request to another language processing system 592 for information regarding the entity mention and/or other context related to the utterance. The language processing system 592 may augment, correct, or base results data upon the audio data 511 as well as any data received from the other language processing system 592.

The NLU component 560 may return NLU results data (which may include tagged text data, indicators of intent, etc.) back to the orchestrator component 530. The orchestrator component 530 may forward the NLU results data to a skill component(s) 590. If the NLU results data includes a single NLU hypothesis, the NLU component 560 and the orchestrator component 530 may direct the NLU results data to the skill component(s) 590 associated with the NLU hypothesis. If the NLU results data includes an N-best list of NLU hypotheses, the NLU component 560 and the orchestrator component 530 may direct the top scoring NLU hypothesis to a skill component(s) 590 associated with the top scoring NLU hypothesis. The system may also include a post-NLU ranker 565 which may incorporate other information to rank potential interpretations determined by the NLU component 560. The local user device 110 may also include its own post-NLU ranker 665, which may operate similarly to the post-NLU ranker 565.

A skill component may be software running on the system component(s) 120 that is akin to a software application. That is, a skill component 590 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 590. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 590 may operate in conjunction between the system component(s) 120 and other devices, such as the user device 110, in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill system component(s) 125 may communicate with a skill component(s) 590 within the system component(s) 120 and/or directly with the orchestrator component 530 or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system component(s) 120 may be configured with a skill component 590 dedicated to interacting with the skill system component(s) 125. Unless expressly stated otherwise, reference to a skill, skill device, or skill component may include a skill component 590 operated by the system component(s) 120 and/or skill operated by the skill system component(s) 125. Moreover, the functionality described herein as a skill or skill may be referred to using many different terms, such as an action, bot, app, or the like. The skill component 590 and or skill system component(s) 125 may return output data to the orchestrator component 530.

In some embodiments, the system component(s) 120 may be configured to send data related to processing of a user input (ASR data, NLU data, the audio data 511, context data, or other data discussed herein above with respect to the user input data 127) to a user input storage 575. Thereafter, the system component(s) 120 may be configured to query the user input storage 575 (e.g., after expiration of a period of time, after data related to the processing of a particular number of user inputs is stored, etc.) for the data related to the processing of the user input(s) and send the data to the system component(s) 121 (e.g., as the user input data 127) to process as described herein above. In some embodiments, the data related to processing of a user input may be stored in the profile storage 570 in association with a user profile of a user associated with the user input.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 572 that manages and/or tracks a dialog between a user and a device. As used herein, a "dialog" may refer to multiple related user inputs and system 100 outputs (e.g., through device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 572 may associate a dialog session identifier with the dialog upon identifying that the user is engaging in a dialog with the user. The dialog manager component 572 may track a user input and the corresponding system generated response to the user input as a turn. The dialog session identifier may correspond to multiple turns of user input and corresponding system generated response. The dialog manager component 572 may transmit data identified by the dialog session identifier directly to the orchestrator component 530 or other component. Depending on system configuration the dialog manager component 572 may determine the appropriate system generated response to give to a particular utterance or user input of a turn. Or creation of the system generated response may be managed by another component of the system (e.g., the language output component 593, NLG component 579, orchestrator component 530, etc.) while the dialog manager component 572 selects the appropriate responses. Alternatively, another component of the system component(s) 120 may select responses using techniques discussed herein. The text of a system generated response may be sent to a TTS component 580 for creation of audio data corresponding to the response. The audio data may then be sent to a user device (e.g., user device 110) for ultimate output to the user. Alternatively (or in addition) a dialog response may be returned in text or some other form.

The dialog manager component 572 may receive the ASR hypothesis/hypotheses (i.e., text data) and make a semantic interpretation of the phrase(s) or statement(s) represented therein. That is, the dialog manager component 572 determines one or more meanings associated with the phrase(s) or statement(s) represented in the text data based on words represented in the text data. The dialog manager component 572 determines a goal corresponding to an action that a user desires be performed as well as pieces of the text data that allow a device (e.g., the user device 110, the system component(s) 120, a skill component 590, a skill system component(s) 125, etc.) to execute the intent. If, for example, the text data corresponds to "what is the weather," the dialog manager component 572 may determine that that the system component(s) 120 is to output weather information associated with a geographic location of the user device 110. In another example, if the text data corresponds to "turn off the lights," the dialog manager component 572 may determine that the system component(s) 120 is to turn off lights associated with the device(s) 110 or the user(s) 105.

The dialog manager component 572 may send the results data to one or more skill component(s) 590. If the results data includes a single hypothesis, the orchestrator component 530 may send the results data to the skill component(s) 590 associated with the hypothesis. If the results data includes an N-best list of hypotheses, the orchestrator component 530 may send the top scoring hypothesis to a skill component(s) 590 associated with the top scoring hypothesis.

The system component(s) includes a language output component 593. The language output component 593 includes a natural language generation (NLG) component 579 and a text-to-speech (TTS) component 580. The NLG component 579 can generate text (or other type of data representing a natural language output) for purposes of TTS output to a user. For example the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580 (e.g., output text data discussed below). Alternatively or in addition, the TTS component 580 may receive text data from a skill component 590 or other system component for output.

The NLG component 579 may include a trained model. The NLG component 579 generates text data from dialog data received by the dialog manager component 572 such that the output text data has a natural feel and, in some embodiments, includes words and/or phrases specifically formatted for a requesting individual. The NLG component 579 may use templates to formulate responses. And/or the NLG component 579 may include models trained from the various templates for forming the output text data. For example, the NLG component 579 may analyze transcripts of local news programs, television shows, sporting events, or any other media program to obtain common components of a relevant language and/or region. As one illustrative example, the NLG component 579 may analyze a transcription of a regional sports program to determine commonly used words or phrases for describing scores or other sporting news for a particular region. The NLG component 579 may further receive, as inputs, a dialog history, an indicator of a level of formality, and/or a command history or other user history such as the dialog history.

The NLG component 579 may generate dialog data based on one or more response templates. Further continuing the example above, the NLG component 579 may select a template in response to the question, "What is the weather currently like?" of the form: "The weather currently is $weather_information$." The NLG component 579 may analyze the logical form of the template to produce one or more textual responses including markups and annotations to familiarize the response that is generated. In some embodiments, the NLG component 579 may determine which response is the most appropriate response to be selected. The selection may, therefore, be based on past responses, past questions, a level of formality, and/or any other feature, or any other combination thereof. Responsive audio data representing the response generated by the NLG component 579 may then be generated using the text-to-speech component 580.

The TTS component 580 may generate audio data (e.g., synthesized speech) from text data using one or more different methods. Text data input to the TTS component 580 may come from a skill component 590, the orchestrator component 530, or another component of the system. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 511 representing the commands to the system component(s) 120 for processing, after which the system component(s) 120 may return output data that can cause the user device 110 to engage its camera.

The system component(s) 120 may include a user recognition component 595 that recognizes one or more users using a variety of data. However, the disclosure is not limited thereto, and the user device 110 may include a user recognition component 695 instead of and/or in addition to user recognition component 595 of the system component(s) 120 without departing from the disclosure. User recognition component 695 operates similarly to user recognition component 595.

The user recognition component 595 may take as input the audio data 511 and/or text data output by the ASR component 550. The user recognition component 595 may perform user recognition by comparing audio characteristics in the audio data 511 to stored audio characteristics of users. The user recognition component 595 may also perform user recognition by comparing biometric data (e.g., fingerprint data, iris data, etc.), received by the system in correlation with the present user input, to stored biometric data of users assuming user permission and previous authorization. The user recognition component 595 may further perform user recognition by comparing image data (e.g., including a representation of at least a feature of a user), received by the system in correlation with the present user input, with stored image data including representations of features of different users. The user recognition component 595 may perform additional user recognition processes, including those known in the art.

The user recognition component 595 determines scores indicating whether user input originated from a particular user. For example, a first score may indicate a likelihood that the user input originated from a first user, a second score may indicate a likelihood that the user input originated from a second user, etc. The user recognition component 595 also determines an overall confidence regarding the accuracy of user recognition operations.

Output of the user recognition component 595 may include a single user identifier corresponding to the most likely user that originated the user input. Alternatively, output of the user recognition component 595 may include an N-best list of user identifiers with respective scores indicating likelihoods of respective users originating the user input. The output of the user recognition component

595 may be used to inform NLU processing as well as processing performed by other components of the system.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs. As discussed above, in some instances, each user profile may also include data related to the processing of one or more user inputs associated with the user by the system component(s) 120.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 6:
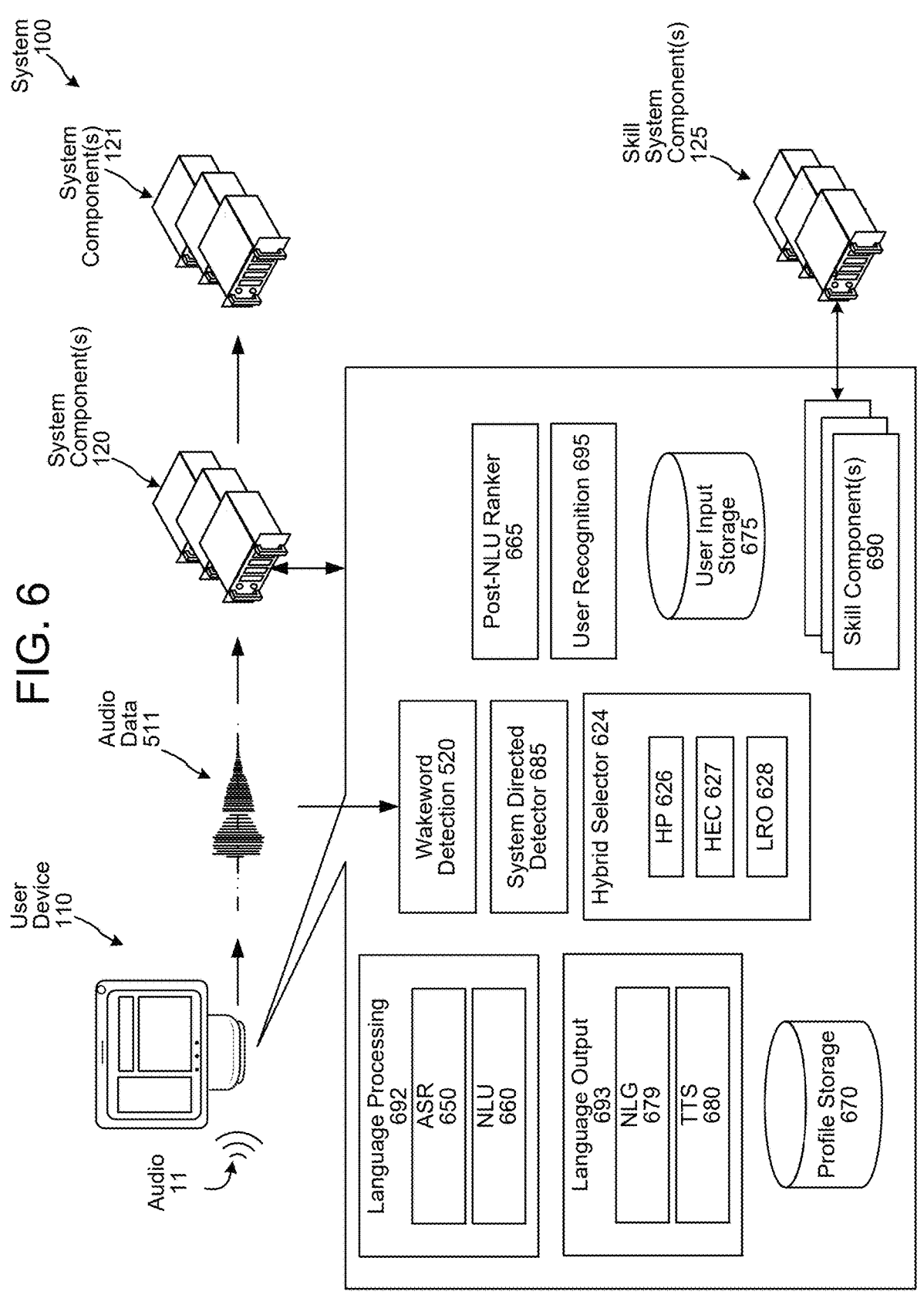
FIG. 6 is a conceptual diagram illustrating components that may be included in a device, according to embodiments of the present disclosure.

Although the components of FIG. 5 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 6 illustrates such a configured user device 110.

In at least some embodiments, the system component(s) may receive the audio data 511 from the user device 110, to recognize speech corresponding to a spoken input in the received audio data 511, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component 680) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 5, the user device 110 may include a wakeword detection component 520 configured to compare the audio data 511 to stored models used to detect a wakeword (e.g., "Alexa") that indicates to the user device 110 that the audio data 511 is to be processed for determining NLU output data (e.g., slot data that corresponds to a named entity, label data, and/or intent data, etc.). In at least some embodiments, a hybrid selector 624, of the user device 110, may send the audio data 511 to the wakeword detection component 520. If the wakeword detection component 520 detects a wakeword in the audio data 511, the wakeword detection component 520 may send an indication of such detection to the hybrid selector 624. In response to receiving the indication, the hybrid selector 624 may send the audio data 511 to the system component(s) and/or the ASR component 650. The wakeword detection component 520 may also send an indication, to the hybrid selector 624, representing a wakeword was not detected. In response to receiving such an indication, the hybrid selector 624 may refrain from sending the audio data 511 to the system component(s), and may prevent the ASR component 650 from further processing the audio data 511. In this situation, the audio data 511 can be discarded.

The user device 110 may conduct its own speech processing using on-device language processing components, such as an SLU/language processing component 692 (which may include an ASR component 650 and an NLU component 660), similar to the manner discussed herein with respect to the SLU component 592 (or ASR component 550 and the NLU component 560) of the system component(s). Language processing component 692 may operate similarly to language processing component 592, ASR component 650 may operate similarly to ASR component 550 and NLU component 660 may operate similarly to NLU component 560. The user device 110 may also internally include, or otherwise have access to, other components such as one or more skill components 690 capable of executing commands based on NLU output data or other results determined by the user device 110/system component(s) (which may operate similarly to skill components 590), a user recognition component 695 (configured to process in a similar manner to that discussed herein with respect to the user recognition component 595 of the system component(s)), profile storage 670 (configured to store similar profile data to that discussed herein with respect to the profile storage 570 of the system component(s)), or other components. In at least some embodiments, the profile storage 670 may only store profile data for a user or group of users specifically associated with the user device 110. Similar to as described above with respect to skill component 590, a skill component 690 may communicate with a skill system component(s) 125. The user device 110 may also have its own language output component 693 which may include NLG component 679 and TTS component 680. Language output component 693 may operate similarly to language output component 593, NLG component 679 may operate similarly to NLG component 579 and TTS component 680 may operate similarly to TTS component 580.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 624, of the user device 110, may include a hybrid proxy (HP) 626 configured to proxy traffic to/from the system component(s). For example, the HP 626 may be configured to send messages to/from a hybrid execution controller (HEC) 627 of the hybrid selector 624. For example, command/directive data received from the system component(s) can be sent to the HEC 627 using the HP 626. The HP 626 may also be configured to allow the audio data 511 to pass to the system component(s) while also receiving (e.g., intercepting) this audio data 511 and sending the audio data 511 to the HEC 627.

In at least some embodiments, the hybrid selector 624 may further include a local request orchestrator (LRO) 628 configured to notify the ASR component 650 about the availability of new audio data 511 that represents user speech, and to otherwise initiate the operations of local language processing when new audio data 511 becomes available. In general, the hybrid selector 624 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 511 is received, the HP 626 may allow the audio data 511 to pass through to the system component(s) and the HP 626 may also input the audio data 511 to the on-device ASR component 650 by routing the audio data 511 through the HEC 627 of the hybrid selector 624, whereby the LRO 628 notifies the ASR component 650 of the audio data 511. At this point, the hybrid selector 624 may wait for response data from either or both of the system component(s) or the local language processing components. However, the disclosure is not limited thereto, and in some examples the hybrid selector 624 may send the audio data 511 only to the local ASR component 650 without departing from the disclosure. For example, the user device 110 may process the audio data 511 locally without sending the audio data 511 to the system component(s).

The local ASR component 650 is configured to receive the audio data 511 from the hybrid selector 624, and to recognize speech in the audio data 511, and the local NLU component 660 is configured to determine a user intent from the recognized speech, and to determine how to act on the user intent by generating NLU output data which may include directive data (e.g., instructing a component to perform an action). Such NLU output data may take a form similar to that as determined by the NLU component 560 of the system component(s). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 660) may be selected as usable to respond to a natural language user input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language user input, to use directive data received from the system component(s), assuming a remote response is even received (e.g., when the user device 110 is able to access the system component(s) over the network(s) 199), or to determine output audio requesting additional information from the user 105.

The user device 110 and/or the system component(s) may associate a unique identifier with each natural language user input. The user device 110 may include the unique identifier when sending the audio data 511 to the system component(s), and the response data from the system component(s) may include the unique identifier to identify which natural language user input the response data corresponds.

In at least some embodiments, the user device 110 may include, or be configured to use, one or more skill components 690 that may work similarly to the skill component(s) 590 implemented by the system component(s). The skill component(s) 690 may correspond to one or more domains that are used in order to determine how to act on a spoken input in a particular way, such as by outputting a directive that corresponds to the determined intent, and which can be processed to implement the desired operation. The skill component(s) 690 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 690, a skill system component(s) 125, or a combination of a skill component 690 and a corresponding skill system component(s) 125.

Similar to the discussion with respect to FIG. 5, in some embodiments, the user device 110 may be configured to send data related to processing of a user input (ASR data, NLU data, the audio data 511, context data, or other data discussed herein above with respect to the user input data 127) to a user input storage 675. Thereafter, the user device 110 may be configured to query the user input storage 675 (e.g., after expiration of a period of time, after data related to the processing of a particular number of user inputs is stored, etc.) and send the data related to processing of the user input(s) to the system component(s) 120 with an instruction to send the data to the system component(s) 121 (e.g., as the user input data 127) to process as described herein above. In some embodiments, the data related to processing of a user input may be stored in the profile storage 670 associated with a user profile of the user 105. In some embodiments, after performing processing with respect to a user input, the user device 110 may send the data related to the processing of the user input to the system component(s) 120 to be stored in the user input storage 575 as discussed herein above with respect to FIG. 5.

Similar to the manner discussed with regard to FIG. 5, the local user device 110 may be configured to recognize multiple different wakewords and/or perform different categories of tasks depending on the wakeword. Such different wakewords may invoke different processing components of local user device 110 (not illustrated in FIG. 6). For example, detection of the wakeword "Alexa" by the wakeword detection component 520 may result in sending audio data to certain language processing components 692/skill components 690 for processing while detection of the wakeword "Computer" by the wakeword detection component may result in sending audio data different language processing components 692/skill components 690 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
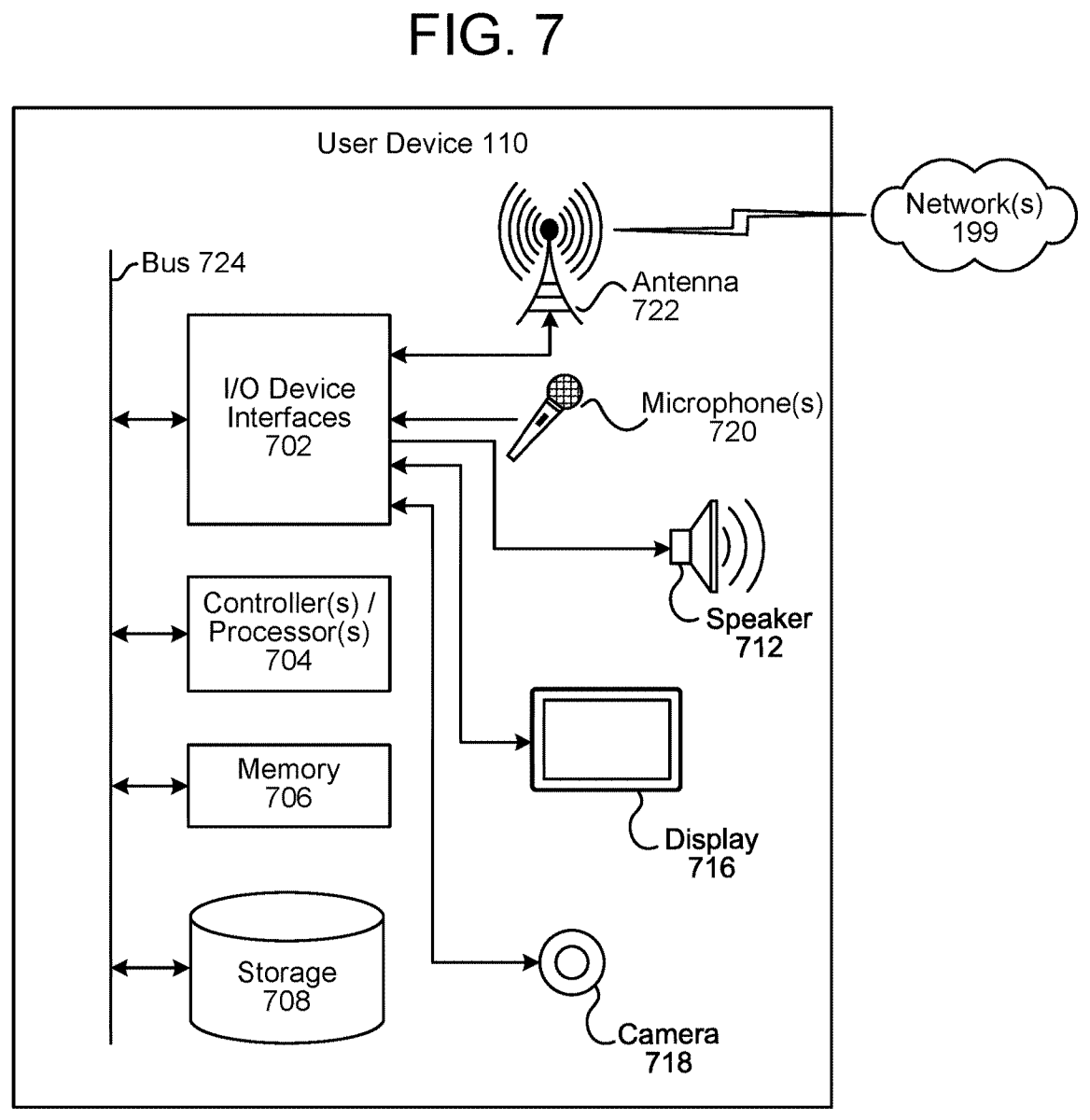
Figure 8:
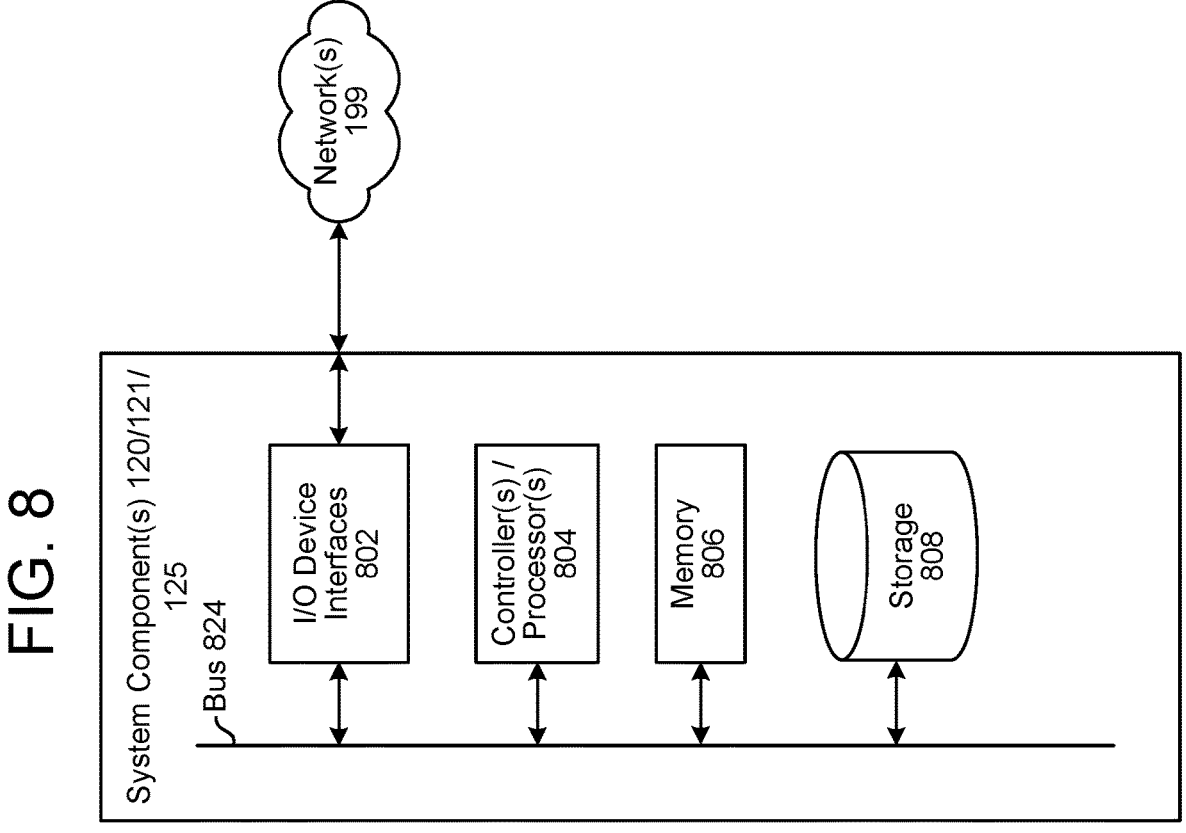
FIG. 8 is a block diagram conceptually illustrating example components of a system, according to embodiments of the present disclosure.

FIG. 7 is a block diagram conceptually illustrating a user device 110 that may be used with the system. FIG. 8 is a block diagram conceptually illustrating example components of a remote device, such as the natural language command processing system component(s), which may assist with ASR processing, NLU processing, etc., and a skill system component(s) 125. A system (120/121/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120/121 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/121/125) may be included in the overall system 100 of the present disclosure, such as one or more natural language processing system component(s) 120 for performing ASR processing, one or more natural language processing system component(s) 120 for performing NLU processing, one or more system component(s) 121 configured to perform processing as described herein above, one or more skill system component(s) 125, etc. In operation, each of these systems may include computer-readable and computer-executable instructions that reside on the respective device (120/121/125), as will be discussed further below.

Each of these devices (110/120/121/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/121/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/121/125) may also be connected to removable or external non-volatile memory and/or storage (such as a removable memory card, memory key drive, networked storage, etc.) through respective input/output device interfaces (702/802).

Computer instructions for operating each device (110/120/121/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/121/125) includes input/output device interfaces (702/802). A variety of components may be connected through the input/output device interfaces (702/802), as will be discussed further below. Additionally, each device (110/120/121/125) may include an address/data bus (724/824) for conveying data among components of the respective device. Each component within a device (110/120/121/125) may also be directly connected to other components in addition to (or instead of) being connected to other components across the bus (724/824).

Referring to FIG. 7, the user device 110 may include input/output device interfaces 702 that connect to a variety of components such as an audio output component such as a speaker 712, a wired headset or a wireless headset (not illustrated), or other component capable of outputting audio. The user device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 716 for displaying content. The user device 110 may further include a camera 718.

Via antenna(s) 722, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the natural language command processing system component(s) 120, the system component(s) 121, or a skill system component(s) 125 may include their own dedicated processors, memory, and/or storage. Alternatively, one or more of the components of the device(s) 110, the natural language command processing system component(s), the system component(s) 121, or a skill system component(s) 125 may utilize the I/O interfaces (702/802), processor(s) (704/804), memory (706/806), and/or storage (708/808) of the device(s) 110, natural language command processing system component(s) 120, system component(s) 121, or the skill system component(s) 125, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components.

The components of the user device 110, the natural language command processing system component(s) 120, the system component(s) 121, and a skill system component(s) 125, as described herein, are illustrative, and may be located as a stand-alone device or may be included, in whole or in part, as a component of a larger device or system. As can be appreciated, a number of components may exist either on a system component(s) and/or on user device 110. For example, language processing 592/692 (which may include ASR 550/650), language output 593/693 (which may include NLG component 579/679 and TTS 580/680), etc., for example as illustrated in FIGS. 5 and 6. Unless expressly noted otherwise, the system version of such components may operate similarly to the device version of such components and thus the description of one version (e.g., the system version or the local version) applies to the description of the other version (e.g., the local version or system version) and vice-versa.

Figure 9:
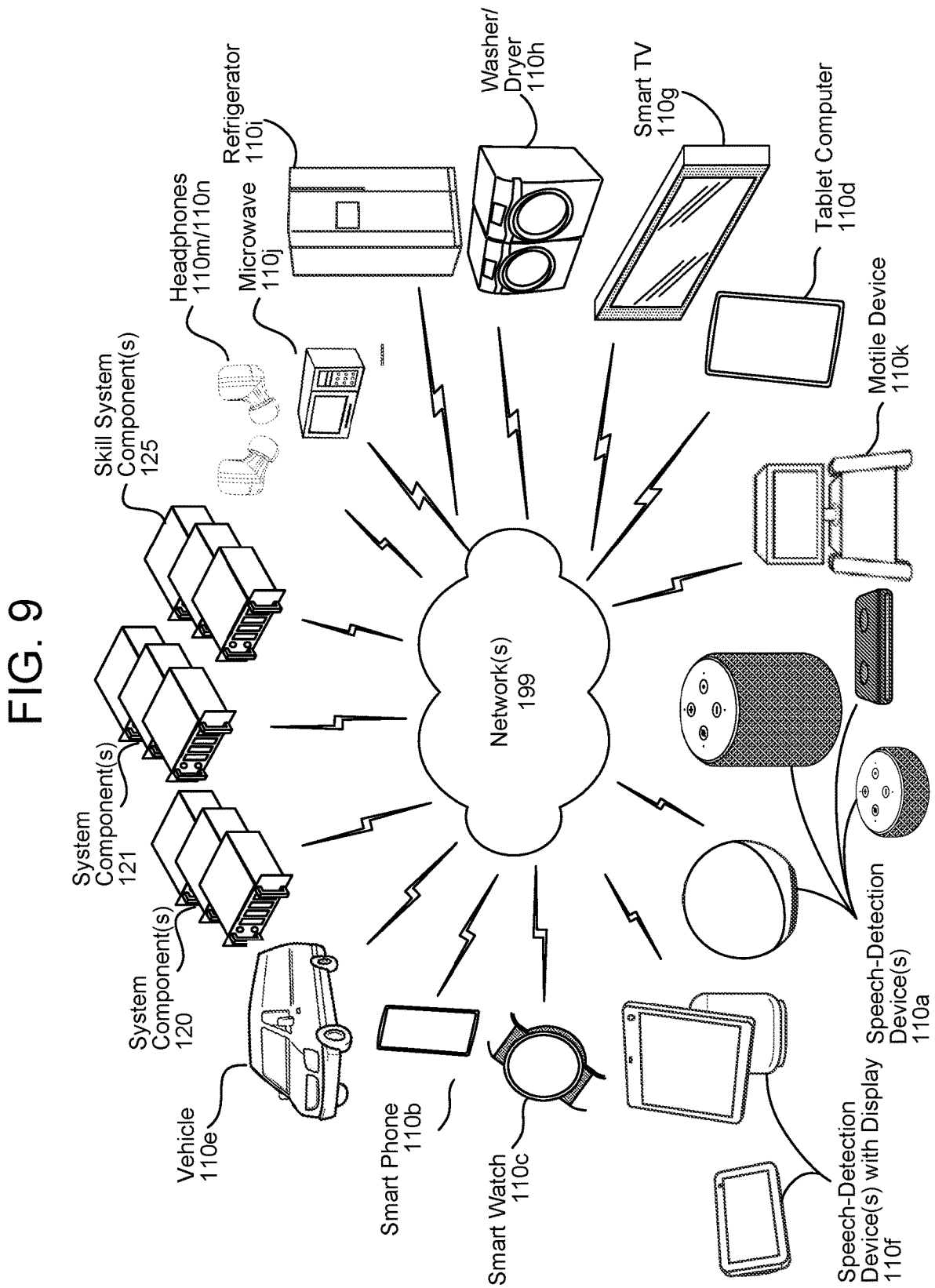
FIG. 9 illustrates an example of a computer network for use with the overall system, according to embodiments of the present disclosure.

As illustrated in FIG. 9, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the system component(s) 121, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first natural language input data corresponding to a first spoken user input;
determining first embedding data representing a first word included in the first natural language input data;
determining second embedding data representing a first entity included in the first natural language input data;
generating first cluster data including the first embedding data and third embedding data, the third embedding data representing a second word included in second natural language input data, the first cluster data representing a first similarity between spoken user inputs;
generating second cluster data including the second embedding data and fourth embedding data, the fourth embedding data representing a second entity included in third natural language input data, the second cluster data representing a second similarity between entities;

processing the first natural language input data, the first cluster data, and the second cluster data to generate first output data representing a first error associated with natural language processing of the first natural language input data, the first output data comprising:

a first value representing the first word included in the first natural language input data being a cause of the first error, and a second value representing the first entity being a cause of the first error;

determining, based on the first value and the second value, that the first error is caused by automatic speech recognition (ASR) processing;

based on determining that the first error is caused by ASR processing, generating training data for a first machine learning model configured to perform ASR processing, the training data including a first portion of the first cluster data;

training the first machine learning model using the training data;

after training the first machine learning model using the training data, processing, using the first machine learning model, audio input data corresponding to a second spoken user input to generate ASR output data including at least the first word; and based on the ASR output data, generating a response to the second spoken user input.

2. The computer-implemented method of claim 1, wherein:

the first value represents that the first error is caused by the ASR processing, determining that the first error is caused by the ASR processing is based on the first value satisfying a first condition, the second value represents that the first error is caused by natural language understanding (NLU) processing, and the method further comprises:

determining that the second value satisfies a second condition;

determining, based on the second value satisfying the second condition, a second error associated with natural language processing of the first natural language input data, the second error being caused by NLU processing; and based on the second error being caused by the NLU processing, generating second training data for a second machine learning model configured to perform the NLU processing, the second training data including a second portion of the second cluster data.

3. The computer-implemented method of claim 1, further comprising:

receiving first data representing the second natural language input data includes second data that is unsupported by the ASR processing; and based on determining that the second natural language input data includes the second data, generating the training data to the first portion of the first cluster data, the first portion including the first natural language input data instead of the second natural language input data.

4. The computer-implemented method of claim 1, further comprising:

determining first data representing that processing of the second natural language input data will result in a second error, the second error being caused by the ASR processing; and based on the first error being caused by the ASR processing, the second error being caused by the ASR processing, and the first cluster data including the first embedding data and the third embedding data, determining a third error associated with the first cluster data, the third error being caused by the ASR processing, wherein generating the training data to include the first cluster data is based on the third error.

5. A computer-implemented method comprising:

receiving first input data corresponding to a first spoken user input;

determining first data corresponding to a first entity included in the first input data;

determining first cluster data including the first input data and third second input data;

determining second cluster data including the first data and second data corresponding to a second entity;

determining, using the first cluster data and the second cluster data, first output data representing a first error associated with processing of the first input data, the first output data comprising:

third data representing a first word included in the first input data being a cause of the first error, and fourth data representing the first entity being a cause of the first error;

determining, based on the first output data, the first error corresponds to a first error type;

based on determining the first error corresponds to the first error type, training, using the first cluster data, a first machine learning model associated with the first error type;

after training the first machine learning model using the first cluster data, processing, using the first machine learning model, third input data corresponding to a second spoken user input to generate second output data including at least one of the first word and the first entity; and based on the second output data, generating a response to the second spoken user input.

6. The computer-implemented method of claim 5, further comprising:

determining the third data satisfies a first condition;

determining, based on determining the third data satisfies the first condition, the first error type corresponds to an error in automatic speech recognition (ASR) processing;

determining the fourth data satisfies a second condition;

determining, based on determining the fourth data satisfies the second condition, a second error associated with processing of the first input data, the second error corresponding to a second error type, the second error type corresponding to natural language understanding (NLU) processing; and based on determining the second error, generating a second indication of the second error type.

7. The computer-implemented method of claim 5, further comprising:

determining the third data satisfies a first condition, wherein determining the first error type is based on determining the third data satisfies the first condition;

determining fifth data representing that processing of the second input data will result in a second error corresponding to the first error type; and based on the first error corresponding to the first error type, the second error corresponding to the first error type, and the first cluster data including the first input data and the second input data, determining a third error associated with the first cluster data, the third error corresponding to the first error type.

8. The computer-implemented method of claim 5, further comprising:

after determining the first error type, generating fifth data representing:

the first input data is associated with first embedding data representing the first input data and second embedding data representing the first entity, the first embedding data is included in the first cluster data, the second embedding data is included in the second cluster data, and the first error associated with the processing of the first input data.

9. The computer-implemented method of claim 5, further comprising:

determining fifth data representing a first lexical diversity of the first input data; and determining third cluster data including the fifth data and sixth fourth data representing a second lexical diversity included in fourth input data, wherein:

the first output data further comprises seventh data representing the first lexical diversity being a cause of the first error, and determining the first error type is further based on the seventh data.

10. The computer-implemented method of claim 5, further comprising:

determining, based on the third data, that the first error type corresponds to an error caused by natural language processing;

based on determining that the first error type corresponds to the error caused by the natural language processing, generating training data for the first machine learning model, the training data to include the first cluster data;

determining, using the first input data, that the first spoken user input includes fifth data that is unsupported by the first machine learning model; and based on determining that the first spoken user input includes the fifth data, generating the training data to include the second input data instead of the first input data.

11. The computer-implemented method of claim 5, wherein the first output data is determined by the first machine learning model, and the method further comprises:

determining a first training set used to train the first machine learning model, the first training set including fourth input data;

processing the first input data, the second input data, and the first training set to determine that determining the first error associated with the processing of the first input data is based on a second error associated with the first machine learning model; and generating an indication of the second error.

12. The computer-implemented method of claim 5, further comprising:

determining the first error type corresponds to an error caused by natural language processing;

based on determining the first error type corresponds to the error caused by the natural language processing, identifying first instructions for remedying the first error type; and executing the first instructions to generate training data for the first machine learning model, the training data to include the first cluster data.

13. A computing system comprising:

at least one processor; and at least one memory including instructions that, when executed by the at least one processor, cause the computing system to:

receive first input data corresponding to a first spoken user input;

determine first data corresponding to a first entity included in the first input data;

determine first cluster data including the first input data and second input data;

determine second cluster data including the first data and second data corresponding to a second entity;

determine, using the first cluster data and the second cluster data, first output data representing a first error associated with processing of the first input data, the first output data comprising:

third data representing a first word included in the first input data being a cause of the first error, and fourth data representing the first entity being a cause of the first error;

determine, based on the first output data, the first error corresponds to a first error type;

based on determining the first error corresponds to the first error type, train, using the first cluster data, a first machine learning model associated with the first error type;

after training the first machine learning model using the first cluster data, process, using the first machine learning model, third input data corresponding to a second spoken user input to generate second output data including at least one of the first word and the first entity; and based on the second output data, generate a response to the second spoken user input.

14. The computing system of claim 13, wherein the at least one memory further comprises instructions that, when executed by the at least one processor, further cause the computing system to:

determine the third data satisfies a first condition;

determine, based on determining the third data satisfies the first condition, the first error type corresponds to an error in automatic speech recognition (ASR) processing;

determine the fourth data satisfies a second condition;

determine, based on determining the fourth data satisfies the second condition, a second error associated with the processing of the first input data, the second error corresponding to a second error type, the second error type corresponding to natural language understanding (NLU) processing; and based on determining the second error, generate a second indication of the second error type.

15. The computing system of claim 13, wherein the at least one memory further comprises instructions that, when executed by the at least one processor, further cause the computing system to:

determine the third data satisfies a first condition, wherein determining the first error type is based on determining the third data satisfies the first condition;

determine fifth data representing that processing of the second input data will result in a second error corresponding to the first error type; and based on the first error corresponding to the first error type, the second error corresponding to the first error type, and the first cluster data including the first input data and the second input data, determine a third error associated with the first cluster data, the third error corresponding to the first error type.

16. The computing system of claim 13, wherein the at least one memory further comprises instructions that, when executed by the at least one processor, further cause the computing system to:

after determining the first error type, generate fifth data representing:
  the first input data is associated with first embedding data representing the first input data and data representing the first entity,
  the first embedding data is included in the first cluster data, the data is included in the second cluster data, and
  the first error associated with the processing of the first input data.

17. The computing system of claim 13, wherein the at least one memory further comprises instructions that, when executed by the at least one processor, further cause the computing system to:

determine fifth data representing a first lexical diversity of the first input data; and determine third cluster data including the fifth data and sixth fourth data representing a second lexical diversity included in fifth fourth input data, wherein:
  the first output data further comprises seventh data representing the first lexical diversity being a cause of the first error, and
  determining the first error type is further based on the seventh data.

18. The computing system of claim 13, wherein the at least one memory further comprises instructions that, when executed by the at least one processor, further cause the computing system to:

determine, based on the third data, that the first error type corresponds to an error caused by natural language processing;

based on determining that the first error type corresponds to the error caused by the natural language processing, generate training data for the first machine learning model, the training data to include the first cluster data;

determine, using the first input data, that the first spoken user input includes fifth data that is unsupported by the first machine learning model; and based on determining that the first spoken user input includes the fifth data, generate the training data to include the second input data instead of the first input data.

19. The computing system of claim 13, wherein the first output data is determined by the first machine learning model, and wherein the at least one memory further comprises instructions that, when executed by the at least one processor, further cause the computing system to:

determine a first training set used to train the first machine learning model, the first training set including fourth input data;

process the first input data, the second input data, and the first training set to determine that determining the first error associated with the processing of the first input data is based on a second error associated with the first machine learning model; and generate an indication of the second error.

20. The computing system of claim 13, wherein the at least one memory further comprises instructions that, when executed by the at least one processor, further cause the computing system to:

determine the first error type corresponds to an error caused by natural language processing;

based on determining the first error type corresponds to the error caused by the natural language processing, identify first instructions for remedying the first error type; and execute the first instructions to generate training data for the first machine learning model, the training data to include the first cluster data.

* * * * *